US012750790B2

(12) United States Patent
Nilsson et al.

(10) Patent No.: US 12,750,790 B2
(45) Date of Patent: Sep. 29, 2026

(54) INDICATION OF REDUCED OUTPUT POWER IN BEAM REPORT

(71) Applicant: Telefonaktiebolaget LM Ericsson (PUBL), Stockholm (SE)

(72) Inventors: Andreas Nilsson, Gothenburg (SE); Claes Tidestav, Bålsta (SE); Jianwei Zhang, Solna (SE); Daniele Davoli, Stockholm (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 0 days.

(21) Appl. No.: 18/040,851

(22) PCT Filed: Aug. 9, 2021

(86) PCT No.: PCT/IB2021/057326
§ 371 (c)(1),
(2) Date: Feb. 7, 2023

(87) PCT Pub. No.: WO2022/029737
PCT Pub. Date: Feb. 10, 2022

(65) Prior Publication Data

US 2023/0276379 A1 Aug. 31, 2023

Related U.S. Application Data

(60) Provisional application No. 63/063,056, filed on Aug. 7, 2020.

(51) Int. Cl.
*H04W 52/42* (2009.01)
*H04W 52/36* (2009.01)

(52) U.S. Cl.
CPC ......... *H04W 52/42* (2013.01); *H04W 52/365* (2013.01); *H04W 52/367* (2013.01)

(58) Field of Classification Search
CPC .............. H04B 17/104; H04W 52/365; H04W 52/367; H04W 52/42
See application file for complete search history.

(56) References Cited

U.S. PATENT DOCUMENTS

2020/0145080 A1 5/2020 Tang et al.
2020/0288412 A1* 9/2020 Ajdakple ............ H04W 52/365
(Continued)

FOREIGN PATENT DOCUMENTS

WO 2018 232245 A1 12/2018
WO 2019 099634 A1 5/2019
WO 2020144641 A1 7/2020

OTHER PUBLICATIONS

Examination Report No. 1 for standard patent application issued by the Australian Government/IP Australia for Application No. 2021323058—Sep. 26, 2023.
(Continued)

*Primary Examiner* — David B Lugo
(74) *Attorney, Agent, or Firm* — Baker Botts L.L.P.

(57) ABSTRACT

According to some embodiments, a method performed by a wireless device for indicating an uplink performance metric in a beam sweep report comprises determining a downlink channel quality associated with each beam of a plurality of downlink beams, determining uplink performance metric associated with each beam of the plurality of downlink beams, selecting a subset of the plurality of downlink beams for reporting in abeam sweep report; and transmitting a beam sweep report to a network node based on the selected subset of downlink beams. The beam sweep report includes the uplink performance metric associated with each downlink beam in the subset of downlink beams.

7 Claims, 24 Drawing Sheets

1700

(56) References Cited

U.S. PATENT DOCUMENTS

| | | | | |
|---|---|---|---|---|
| 2022/0006507 A1* | 1/2022 | Guan | .................... | H04B 1/3827 |
| 2023/0291442 A1* | 9/2023 | Davoli | .................. | H04B 7/0695 |

OTHER PUBLICATIONS

3GPP TSG RAN WG1 Meeting #90; Prague, Czechia; Source: ZTE; Title: On NR PHR calculation (R1-1712313)—Aug. 21-25, 2017.
PCT International Search Report issued for International application No. PCT/IB2021/057326—Nov. 5, 2021.
PCT Written Opinion for the International Searching Authority issued for International application No. PCT/IB2021/057326—Nov. 5, 2021.
Apple Inc, "Remaining Issues on Multi-beam operation", 3GPP TSG RAN WG1 #98, R1-1909048, Aug. 26-30, 2019, Prague, CZ.
China Telecom, "Enhancements on multi-beam operation", 3GPP TSG RAN WG1 #98, R1-1908886, Aug. 26-30, 2019, Prague, CZ.
Nokia et al., "Enhancements on Multi-beam Operation", 3GPP TSG RAN WG1 #98, R1-1909210, Aug. 26-30, 2019, Prague Czech Republic.

* cited by examiner

| Numerology | Slot length | RB BW |
|---|---|---|
| 15 kHz | 1 ms | 180 kHz |
| 30 kHz | 0.5 ms | 360 kHz |
| 60 kHz | 0.25 ms | 720 kHz |
| 120 kHz | 125 μs | 1.44 MHz |
| 240 kHz | 62.5 μs | 2.88 MHz |

Fig. 2

***PUCCH-SpatialRelationInfo* information element**

```
-- ASN1START
-- TAG-PUCCH-SPATIALRELATIONINFO-START

PUCCH-SpatialRelationInfo ::=          SEQUENCE {
    pucch-SpatialRelationInfoId        PUCCH-SpatialRelationInfoId,
    servingCellId                          ServCellIndex                                                   OPTIONAL,   -- Need S
    referenceSignal                        CHOICE {
        ssb-Index                              SSB-Index,
        csi-RS-Index                           NZP-CSI-RS-ResourceId,
        srs                                    PUCCH-SRS
    },
    pucch-PathlossReferenceRS-Id           PUCCH-PathlossReferenceRS-Id,
    p0-PUCCH-Id                            P0-PUCCH-Id,
    closedLoopIndex                        ENUMERATED { i0, i1 }
}

PUCCH-SpatialRelationInfo-r16 ::=      SEQUENCE {
    pucch-SpatialRelationInfoId-r16        PUCCH-SpatialRelationInfoId-r16,
    servingCellId-r16                      ServCellIndex                                                   OPTIONAL,   -- Need S
    referenceSignal-r16                    CHOICE {
        ssb-Index                              SSB-Index,
        csi-RS-Index                           NZP-CSI-RS-ResourceId,
        srs                                    PUCCH-SRS
    },
    pucch-PathlossReferenceRS-Id-r16       PUCCH-PathlossReferenceRS-Id-r16,
    p0-PUCCH-Id-r16                        P0-PUCCH-Id,
    closedLoopIndex-r16                    ENUMERATED { i0, i1 }
}

PUCCH-SRS ::=   SEQUENCE {
    resource                           SRS-ResourceId,
    uplinkBWP                          BWP-Id
}
-- TAG-PUCCH-SPATIALRELATIONINFO-STOP
-- ASN1STOP
```

Fig. 8

```
SRS-SpatialRelationInfo ::=     SEQUENCE {
    servingCellId                   ServCellIndex                                   OPTIONAL,   -- Need S
    referenceSignal                 CHOICE {
        ssb-Index                       SSB-Index,
        csi-RS-Index                    NZP-CSI-RS-ResourceId,
        srs                             SEQUENCE {
            resourceId                      SRS-ResourceId,
            uplinkBWP                       BWP-Id
        }
    }
}
```

Fig. 9

INDICATION OF REDUCED OUTPUT POWER IN BEAM REPORT

PRIORITY

This nonprovisional application is a U.S. National Stage Filing under 35 U.S.C. § 371of International Patent Application Serial No. PCT/IB2021/057326 filed Aug. 9, 2021 and entitled "Indication of Reduced Output Power in Beam Report" which claims priority to U.S. Provisional Patent Application No. 63/063,056 filed Aug. 7, 2020, both of which are hereby incorporated by reference in their entirety.

TECHNICAL FIELD

Particular embodiments relate to wireless communication, and more specifically to fifth generation (5G) new radio (NR) beam reporting with uplink power.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

The new generation mobile wireless communication system (5G) or new radio (NR) supports a diverse set of use cases and a diverse set of deployment scenarios.

NR uses CP-OFDM (Cyclic Prefix Orthogonal Frequency Division Multiplexing) in the downlink (i.e., from a network node, gNB, eNB, or base station, to a user equipment (UE)) and both CP-OFDM and discrete Fourier transform (DFT)-spread OFDM (DFT-S-OFDM) in the uplink (i.e., from UE to gNB). In the time domain, NR downlink and uplink physical resources are organized into equally-sized subframes of 1 ms each. A subframe is further divided into multiple slots of equal duration.

The slot length depends on subcarrier spacing. For subcarrier spacing of $\Delta f=15$ kHz, there is only one slot per subframe and each slot always consists of 14 OFDM symbols, irrespectively of the subcarrier spacing.

Typical data scheduling in NR are per slot basis, an example is illustrated in FIG. 1, where the first two symbols contain physical downlink control channel (PDCCH) and the remaining 12 symbols contains physical data channel (PDCH), either a PDSCH (physical downlink shared channel) or PUSCH (physical uplink shared channel).

Different subcarrier spacing values are supported in NR. The supported subcarrier spacing values (also referred to as different numerologies) are given by $\Delta f=(15\times 2^{\alpha})$ kHz where $\alpha$ is a non-negative integer. $\Delta f=15$ kHz is the basic subcarrier spacing that is also used in long term evolution (LTE). The slot durations at different subcarrier spacings are illustrated in FIG. 2.

In the frequency domain physical resource definition, a system bandwidth is divided into resource blocks (RBs), each corresponds to 12 contiguous subcarriers. The common RBs (CRB) are numbered starting with 0 from one end of the system bandwidth. The UE is configured with one or up to four bandwidth part (BWPs) which may be a subset of the RBs supported on a carrier. Thus, a BWP may start at a CRB larger than zero. All configured BWPs have a common reference, the CRB 0. Thus, a UE can be configured a narrow BWP (e.g., 10 MHz) and a wide BWP (e.g., 100 MHz), but only one BWP can be active for the UE at a given point in time. The physical RB (PRB) are numbered from 0 to N−1 within a BWP (but the 0:th PRB may thus be the K:th CRB where K>0).

The basic NR physical time-frequency resource grid is illustrated in FIG. 3, where only one resource block (RB) within a 14-symbol slot is shown. One OFDM subcarrier during one OFDM symbol interval forms one resource element (RE).

Downlink transmissions can be dynamically scheduled, i.e., in each slot the gNB transmits downlink control information (DCI) over PDCCH about which UE data is to be transmitted to and which RBs in the current downlink slot the data is transmitted on. PDCCH is typically transmitted in the first one or two OFDM symbols in each slot in NR. The UE data are carried on PDSCH. A UE first detects and decodes PDCCH. if the decoding is successful, then the UE decodes the corresponding PDSCH based on the decoded control information in the PDCCH.

Uplink data transmission can also be dynamically scheduled using PDCCH. Similar to downlink, a UE first decodes uplink grants in PDCCH and then transmits data over PUSCH based the decoded control information in the uplink grant such as modulation order, coding rate, uplink resource allocation, etc.

A synchronization signal block (SSB) is a broadcast signal in NR that aims to provide initial synchronization, basic system information and mobility measurements. The structure of SSB is illustrated in FIG. 4 and consists of one primary synchronization signal (PSS), one secondary synchronization signal (SSS) and a physical broadcast channel (PBCH). The PSS and SSS are transmitted over 127 subcarriers, where the sub-carrier spacing could be 15/30 kHz for below 6 GHz and 120/240 kHz for above 6 GHz.

For low frequencies it is expected that each cell transmits one SSB that covers the whole cell while for higher frequencies several beamformed SSB is expected to be needed to attain coverage over the whole cell, as illustrated in in FIG. 5. The maximum number of configurable SSBs per cell depends on the carrier frequency: below 3 GHz=4, 3-6 GHz=8 above 6 GHz=64. The SSBs are transmitted in an SSB transmission burst which could last up to 5 ms. The periodicity of the SSB burst are configurable with the following options: 5, 10, 20, 40, 80, 160 ms.

Messages transmitted over the radio link to users can be broadly classified as control messages or data messages. Control messages are used to facilitate the proper operation of the system as well as proper operation of each UE within the system. Control messages may include commands to control functions such as the transmitted power from a UE, signaling of RBs within which the data is to be received by the UE or transmitted from the UE and so on.

Examples of control messages in NR are the physical downlink control channel (PDCCH) which, for example, carry scheduling information and power control messages. Depending on what control data is conveyed in the PDCCH, different DCI formats may be used. The PDCCH messages in NR are demodulated using the PDCCH demodulation reference signal (DMRS) that is frequency multiplexed with DCI. This means that the PDCCH is a self-contained transmission that enables beamforming of the PDCCH.

In NR, the PDCCH is located within one or several configurable/dynamic control regions called control resource sets (CORESETs). The size of the CORESET, with respect to time and frequency, is flexible in NR. In the frequency domain, the allocation is done in units of 6 resource blocks (RBs) using a bitmap, and in the time domain, a CORESET can consist of 1-3 consecutive OFDM symbols. A CORESET is then associated with a search space set to define when in time the UE should monitor the CORESET.

The search space set includes, for example, parameters defining the periodicity, OFDM start symbol within a slot, slot-level offset, which DCI formats to blindly decode and the aggregation level of the DCI formats. This means that a CORESET and the associated search space set together define when in time and frequency the UE should monitor for control channel reception. Even though OFDM PDCCH can be located in any OFDM symbol in a slot, it is expected that the PDCCH mainly will be scheduled in the first few OFDM symbols of a slot to enable early data decoding and low-latency.

A UE may be configured with up to five CORESETs per “PDCCH-config”, which means that the maximum number of CORESETs per serving cell is 20 (because the maximum number of BWPs per serving cell is 4, it gives 4*5=20). Each CORESET may be configured with a transmission configuration indicator (TCI) state containing a DL-RS as spatial quasi colocation (QCL) indication, indicating to the UE a spatial direction from where the UE can assume to receive the PDCCHs corresponding to that CORESET. To improve the reliability (counteract radio link failure (RLF) due to blocking) a UE can be configured with multiple CORESETs, each with different spatial QCL assumptions (TCI states). In this way, if one beam pair link is blocked (for example a beam pair link associated with a first spatial QCL relation), the UE might still be reached by the network by transmitting PDCCH associated with a CORSET configured with another spatial QCL relation.

In the high frequency range (FR2), multiple radio frequency (RF) beams may be used to transmit and receive signals at a gNB and a UE. For each downlink beam from a gNB, there is typically an associated best UE Rx beam for receiving signals from the downlink beam. The downlink beam and the associated UE Rx beam forms a beam pair. The beam pair can be identified through a beam management process in NR.

A downlink beam is (typically) identified by an associated downlink reference signal (DL-RS) transmitted in the beam, either periodically, semi-persistently, or aperiodically. The DL-RS for the purpose can be a synchronization signal (SS) and physical broadcast channel (PBCH) block (SSB) or a channel state information RS (CSI-RS). For each DL-RS, a UE can do a Rx beam sweep to determine the best Rx beam associate with the downlink beam. The best Rx beam for each DL-RS is then memorized by the UE. By measuring all the DL-RSs, the UE can determine and report to the gNB the best downlink beam to use for downlink transmissions.

With the reciprocity principle, the same beam pair can also be used in the uplink to transmit an uplink signal to the gNB, often referred to as beam correspondence.

An example is illustrated in FIG. 6, where a gNB consists of a transmission point (TRP) with two downlink beams each associated with a CSI-RS and one SSB beam. Each of the downlink beams is associated with a best UE Rx beam, i.e., Rx beam #1 is associated with the downlink beam with CSI-RS #1 and Rx beam #2 is associated with the downlink beam with CSI-RS #2.

Because of UE movement or environment change, the best downlink beam for a UE may change over time and different downlink beams may be used in different times. The downlink beam used for a downlink data transmission in PDSCH may be indicated by a transmission configuration indicator (TCI) field in the corresponding DCI scheduling the PDSCH or activating the PDSCH for semi-persistent scheduling (SPS). The TCI field indicates a TCI state which contains a DL-RS associated with the downlink beam. In the DCI, a PUCCH resource is indicated for carrying the corresponding HARQ A/N.

The uplink beam for carrying the PUCCH is determined by a PUCCH spatial relation activated for the PUCCH resource. For PUSCH transmission, the uplink beam is indicated indirectly by a sounding reference signal (SRS) resource indicator (SRI), which points to one or more SRS resources associated with the PUSCH transmission. The SRS resource(s) can be periodic, semi-persistent, or aperiodic. Each SRS resource is associated with a SRS spatial relation in which a D-RS (or another periodic SRS) is specified. The uplink beam for the PUSCH is implicitly indicated by the SRS spatial relation(s).

Spatial relation is used in NR to refer to a spatial relationship between an uplink channel or signal, such as PUCCH, PUSCH and SRS, and a DL (or UL) reference signal (RS), such as CSI-RS, SSB, or SRS. If an uplink channel or signal is spatially related to a DL-RS, it means that the UE should transmit the uplink channel or signal with the same beam used in receiving the DL-RS previously. More precisely, the UE should transmit the uplink channel or signal with the same spatial domain transmission filter used for the reception of the DL-RS.

If a uplink channel or signal is spatially related to a uplink SRS, then the UE may apply the same spatial domain transmission filter for the transmission for the uplink channel or signal as the one used to transmit the SRS.

Using DL-RSs as the source RS in a spatial relation is very effective when the UE can transmit the uplink signal in the opposite direction from which it previously received the DL-RS, or in other words, if the UE can achieve the same Tx antenna gain during transmission as the antenna gain it achieved during reception. This capability (known as beam correspondence) will not always be perfect. Because of, e.g., imperfect calibration, the uplink Tx beam may point in another direction, resulting in a loss in uplink coverage. To improve the performance in this situation, uplink beam management based on SRS sweeping can be used. To achieve optimum performance, the procedure depicted in FIG. 7 may be repeated as soon as the UEs Tx beam changes.

In the first step, the UE transmits a series of uplink signals (SRS resources) using different Tx beams. The gNB then performs measurements for each of the SRS transmissions, and determines which SRS transmission was received with the best quality, or highest signal quality. The gNB then signals the preferred SRS resource to the UE. The UE subsequently transmits the PUSCH in the same beam where it transmitted the preferred SRS resource.

For PUCCH, up to 64 spatial relations may be configured for a UE and one of the spatial relations is activated by a media access control (MAC) control element (CE) for each PUCCH resource.

FIG. 8 is a PUCCH spatial relation information element (IE) that a UE can be configured in NR. It includes one of a SSB index, a CSI-RS resource identity (ID), and SRS resource ID as well as some power control parameters such as pathloss RS, closed-loop index, etc.

For each periodic and semi-persistent SRS resource or aperiodic SRS with usage "non-codebook" configured, its associated downlink CSI-RS is RRC configured. For each aperiodic SRS resource with usage "codebook" configured, the associated DL-RS is specified in a SRS spatial relation activated by a MAC CE. An example is illustrated in FIG. 9, where one of a SSB index, a CSI-RS resource identity (ID), and SRS resource ID is configured.

For PUSCH, its spatial relation is defined by the spatial relation of the corresponding SRS resource(s) indicated by the SRI in the corresponding DCI.

Several signals can be transmitted from different antenna ports of a same base station. These signals can have the same large-scale properties such as Doppler shift/spread, average delay spread, or average delay. These antenna ports are then said to be quasi co-located (QCL).

If the UE knows that two antenna ports are QCL with respect to a certain parameter (e.g., Doppler spread), the UE can estimate that parameter based on one of the antenna ports and apply that estimate for receiving signal on the other antenna port.

For example, the TCI state may indicate a QCL relation between a CSI-RS for tracking RS (TRS) and the PDSCH DMRS. When a UE receives the PDSCH DMRS it can use the measurements already made on the TRS to assist the DMRS reception.

Information about what assumptions can be made regarding QCL is signaled to the UE from the network. In NR, four types of QCL relations between a transmitted source RS and transmitted target RS were defined:

Type A: {Doppler shift, Doppler spread, average delay, delay spread}

Type B: {Doppler shift, Doppler spread}

Type C: {average delay, Doppler shift}

Type D: {Spatial Rx parameter}

QCL type D was introduced to facilitate beam management with analog beamforming and is known as spatial QCL. There is currently no strict definition of spatial QCL, but the understanding is that if two transmitted antenna ports are spatially QCL, the UE can use the same Rx beam to receive them. This is helpful for a UE that uses analog beamforming to receive signals, because the UE needs to adjust its RX beam in some direction prior to receiving a certain signal. If the UE knows that the signal is spatially QCL with some other signal it has received earlier, then it can safely use the same RX beam to also receive this signal. For beam management, the discussion mostly revolves around QCL Type D, but it is also necessary to convey a Type A QCL relation for the RSs to the UE, so that it can estimate all the relevant large-scale parameters.

Typically, this is achieved by configuring the UE with a CSI-RS for tracking (TRS) for time/frequency offset estimation. To be able to use any QCL reference, the UE needs to receive it with a sufficiently good signal to interference plus noise ratio (SINR). In many cases, this means that the TRS has to be transmitted in a suitable beam to a certain UE.

To introduce dynamics in beam and transmission point (TRP) selection, the UE can be configured through RRC signaling with M TCI states, where M is up to 128 in frequency range 2 (FR2) for the purpose of PDSCH reception and up to 8 in FR1, depending on UE capability.

Each TCI state contains QCL information, i.e., one or two source DL-RSs, each source RS associated with a QCL type. For example, a TCI state contains a pair of reference signals, each associated with a QCL type, e.g., two different CSI-RSs {CSI-RS1, CSI-RS2} is configured in the TCI state as {qcl-Type1, qcl-Type2}={Type A, Type D}. It means the UE can derive Doppler shift, Doppler spread, average delay, delay spread from CSI-RS1 and Spatial Rx parameter (i.e., the RX beam to use) from CSI-RS2.

Each of the M states in the list of TCI states can be interpreted as a list of M possible beams transmitted from the network or a list of M possible TRPs used by the network to communicate with the UE. The M TCI states can also be interpreted as a combination of one or multiple beams transmitted from one or multiple TRPs.

A first list of available TCI states is configured for PDSCH, and a second list of TCI states is configured for PDCCH. Each TCI state contains a pointer, known as TCI State ID, which points to the TCI state. The network then activates via MAC CE one TCI state for PDCCH (i.e., provides a TCI for PDCCH) and up to eight active TCI states for PDSCH. The number of active TCI states the UE supports is a UE capability, but the maximum is 8.

Each configured TCI state contains parameters for the quasi co-location associations between source reference signals (CSI-RS or SS/PBCH) and target reference signals (e.g., PDSCH/PDCCH DMRS ports). TCI states are also used to convey QCL information for the reception of CSI-RS.

Assume a UE is configured with 4 active TCI states (from a list of totally 64 configured TCI states). Thus, 60 TCI states are inactive for this particular UE (but some may be active for another UE) and the UE need not be prepared to have large scale parameters estimated for those. But the UE continuously tracks and updates the large scale parameters for the 4 active TCI states by measurements and analysis of the source RSs indicated by each TCI state. When scheduling a PDSCH to a UE, the DCI contains a pointer to one active TCI. The UE then knows which large scale parameter estimate to use when performing PDSCH DMRS channel estimation and thus PDSCH demodulation.

MAC CE signaling may be used to indicate TCI state for UE specific PDCCH. The structure of the MAC CE for indicating TCI state for UE specific PDCCH is given in FIG. 10.

As illustrated in FIG. 10, the MAC CE contains the following fields:

Serving Cell ID: This field indicates the identity of the Serving Cell for which the MAC CE applies. The length of the field is 5 bits;

CORESET ID: This field indicates a Control Resource Set identified with ControlResourceSetId as specified in 3GPP TS 38.331, for which the TCI State is being indicated. In case the value of the field is 0, the field refers to the Control Resource Set configured by controlResourceSetZero as specified in TS 38.33. The length of the field is 4 bits;

TCI State ID: This field indicates the TCI state identified by TCI-StateId as specified in TS 38.331 applicable to the Control Resource Set identified by CORESET ID field. If the field of CORESET ID is set to 0, this field indicates a TCI-StateId for a TCI state of the first 64 TCI-states configured by tci-States-ToAddModList and tci-States-ToReleaseList in the PDSCH-Config in the active BWP. If the field of CORESET ID is set to the other value than 0, this field indicates a TCI-StateId configured by tci-StatesPDCCH-ToAddList and tci-StatesPDCCH-ToReleaseList in the controlResourceSet identified by the indicated CORESET ID. The length of the field is 7 bits.

The MAC CE for Indication of TCI States for UE-specific PDCCH has a fixed size of 16 bits.

Note that CORESET ID identified with ControlResourceSetId is specified in 3GPP TS38.331 as follows. The ControlResourceSetId IE concerns a short identity used to identify a control resource set within a serving cell. The ControlResourceSetId=0 identifies the ControlResourceSet #0 configured via PBCH (MIB) and in controlResourceSetZero (ServingCellConfigCommon). The ID space is used across the BWPs of a serving cell. The number of CORESETs per BWP is limited to 3 (including common and UE-specific CORESETs).

ControlResourceSetId Information Element

```
-- ASN1START
-- TAG-CONTROLRESOURCESETID-START
ControlResourceSetId : : =        INTEGER ( ) . . . max-
NrofcontrolResourceSets−1)
-- TAG-CONTROLRESOURCESETID-STOP
-- ASN1STOP
```

In NR Rel-15, maxNrofControlResourceSets represents the maximum number of CORESETs per serving cells, which is 12. The maximum number of bandwidth parts (BWPs) per serving cell is 4 in NR Rel-15. These maximum values are defined in TS 38.331 Section 6.4 as follows:

```
-- ASN1START
-- TAG-MULTIPLICITY-AND-TYPE-CONSTRAINT-DEFINITIONS-START
. . .
maxNrofBWPs                    INTEGER ::= 4         -- Maximum number
of BWPs per serving cell
. . .
maxNrofControlResourceSets-1          INTEGER ::= 11         -- Max number of
CoReSets configurable on a serving cell minus 1
```

The existing way of using spatial relation for uplink beam indication in NR is cumbersome and inflexible. To facilitate uplink beam selection for UEs equipped with multiple panels, a unified TCI framework for uplink fast panel selection is to be evaluated and introduced in NR Rel-17. Similar to downlink, where TCI states are used to indicate downlink beams/TRPs, TCI states may also be used to select uplink panels and beams used for uplink transmissions (i.e., PUSCH, PUCCH, and SRS).

It is envisioned that uplink TCI states are configured by higher layers (i.e., RRC) for a UE in a number of possible ways. In one scenario, uplink TCI states are configured separately from the downlink TCI states and each uplink TCI state may contain a DL-RS (e.g., NZP CSI-RS or SSB) or an uplink RS (e.g., SRS) to indicate a spatial relation. The uplink TCI states can be configured either per uplink channel/signal or per BWP such that the same uplink TCI states can be used for PUSCH, PUCCH, and SRS. Alternatively, a same list of TCI states may be used for both downlink and uplink, thus a UE is configured with a single list of TCI states for both uplink and downlink beam indication. The single list of TCI states in this case can be configured either per uplink channel/signal or per BWP information elements.

Similar to LTE, in NR a unique reference signal is transmitted from each antenna port at the gNB for downlink channel estimation at a UE. Reference signals for downlink channel estimation are commonly referred to as channel state information reference signal (CSI-RS). For N antenna ports, there are N CSI-RS signals, each associated with one antenna port.

By measuring on CSI-RS, a UE can estimate the effective channel the CSI-RS is traversing including the radio propagation channel and antenna gains at both the gNB and the UE. Mathematically, this implies that if a known CSI-RS signal $x_i$($i=1, 2, \ldots, N_{tx}$) is transmitted on the ith transmit antenna port at gNB, the received signal $y_j$ ($j=1, 2, \ldots, N_{rx}$) on the jth receive antenna port of a UE can be expressed as $$y_j = h_{i,j}x_i + n_j$$

where $h_{i,j}$ is the effective channel between the ith transmit antenna port and the jth receive antenna port, $n_j$ is the receiver noise associated with the jth receive antenna port, $N_{tx}$ is the number of transmit antenna ports at the gNB and $N_{rx}$ is the number of receive antenna ports at the UE.

A UE can estimate the $N_{rx} \times N_{tx}$ effective channel matrix H($H(i,j)=h_{i,j}$) and thus the channel rank, precoding matrix, and channel quality. This is achieved by using a predesigned codebook for each rank, with each codeword in the codebook being a precoding matrix candidate. A UE searches through the codebook to find a rank, a codeword associated with the rank, and channel quality associated with the rank and precoding matrix to best match the effective channel. The rank, the precoding matrix and the channel quality are reported in the form of a rank indicator (RI), a precoding matrix indicator (PMI) and a channel quality indicator (CQI) as part of CSI feedback. This results in channel dependent precoding or closed-loop precoding. Such precoding strives to focus the transmit energy into a subspace which is strong in the sense of conveying much of the transmitted energy to the UE.

A CSI-RS signal is transmitted on a set of time-frequency resource elements (REs) associated with an antenna port. For channel estimation over a system bandwidth, CSI-RS is typically transmitted over the whole system bandwidth. The set of REs used for CSI-RS transmission is referred to as CSI-RS resource. From a UE point of view, an antenna port is equivalent to a CSI-RS that the UE shall use to measure the channel. Up to 32 (i.e. $N_{tx}=32$) antenna ports are supported in NR and thus 32 CSI-RS signals can be configured for a UE.

In NR, the following three types of CSI-RS transmissions are supported. For periodic CSI-RS transmission, CSI-RS is transmitted periodically in certain subframes or slots. This CSI-RS transmission is semi-statically configured using parameters such as CSI-RS resource, periodicity and subframe or slot offset similar to LTE.

Aperiodic CSI-RS transmission is a one-shot CSI-RS transmission that can happen in any subframe or slot. Here, one-shot means that CSI-RS transmission only happens once per trigger. The CSI-RS resources (i.e., the resource element locations which consist of subcarrier locations and OFDM symbol locations) for aperiodic CSI-RS are semi-statically configured. The transmission of aperiodic CSI-RS is triggered by dynamic signaling through PDCCH. The triggering may also include selecting a CSI-RS resource from multiple CSI-RS resources.

Semi-Persistent CSI-RS transmission is similar to periodic CSI-RS, resources for semi-persistent CSI-RS transmissions are semi-statically configured with parameters such as periodicity and subframe or slot offset. However, unlike periodic CSI-RS, dynamic signaling is needed to activate and possibly deactivate the CSI-RS transmission. An example is illustrated in FIG. 11.

In LTE, UEs can be configured to report CSI in periodic or aperiodic reporting modes. Periodic CSI reporting is carried on PUCCH while aperiodic CSI is carried on PUSCH. PUCCH is transmitted in a fixed or configured number of PRBs and using a single spatial layer (or rank 1) with QPSK modulation. PUSCH resources carrying aperiodic CSI reporting are dynamically allocated through uplink grants carried over PDCCH or enhanced PDCCH (EPDCCH), and can occupy a variable number of PRBs, use modulation states such as QPSK, 16QAM, and 64 QAM, as well as multiple spatial layers.

In NR, in addition to periodic and aperiodic CSI reporting as in LTE, semi-persistent CSI reporting may also be supported. Thus, three types of CSI reporting may be supported in NR as follows. For periodic CSI reporting, CSI is reported periodically by the UE. Parameters such as periodicity and subframe or slot offset are configured semi-statically, by higher layer signaling from the gNB to the UE.

Aperiodic CSI reporting involves a single-shot (i.e., one time) CSI report by the UE, which is dynamically triggered by the gNB, e.g., by the DCI in PDCCH. Some of the parameters related to the configuration of the aperiodic CSI report are semi-statically configured from the gNB to the UE but the triggering is dynamic.

Semi-Persistent CSI reporting is similar to periodic CSI reporting, semi-persistent CSI reporting has a periodicity and subframe or slot offset which may be semi-statically configured by the gNB to the UE. However, a dynamic trigger from gNB to UE may be needed to allow the UE to begin semi-persistent CSI reporting.

With regards to CSI-RS transmission and CSI reporting, the following combinations may be supported in NR. For periodic CSI-RS transmission, aemi-persistent CSI reporting is dynamically activated/deactivated, and aperiodic CSI reporting is triggered by DCI. For semi-persistent transmission of CSI-RS, semi-persistent CSI reporting is activated/deactivated dynamically, and aperiodic CSI reporting is triggered by DCI. For aperiodic transmission of CSI-RS, aperiodic CSI reporting is triggered by DCI, and aperiodic CSI-RS is triggered dynamically.

For NR, a UE can be configured with N≥1 CSI reporting settings, M≥1 Resource settings, and 1 CSI measurement setting, where the CSI measurement setting includes L≥1 links and value of L may depend on the UE capability. At least the following configuration parameters are signaled via RRC at least for CSI acquisition.

N, M, and L are indicated either implicitly or explicitly. In each CSI reporting setting, at least the following parameters are supported: reported CSI parameter(s), CSI Type (I or II) if reported, codebook configuration including codebook subset restriction, time-domain behavior, frequency granularity for CQI and PMI, measurement restriction configurations. In each resource setting the parameters include a configuration of S≥1 CSI-RS resource set(s), and a configuration of $K_s$≥1 CSI-RS resources for each set s, including at least: mapping to REs, the number of ports, time-domain behavior, etc. The resource setting parameters also include time domain behavior: aperiodic, periodic or semi-persistent, and RS type that encompasses at least CSI-RS.

In each of the L links in CSI measurement setting the parameters include, CSI reporting setting indication, resource setting indication, quantity to be measured (either channel or interference). One CSI reporting setting can be linked with one or multiple resource settings and multiple CSI reporting settings can be linked.

At least, the following are dynamically selected by L1 or L2 signaling, if applicable: one or multiple CSI reporting settings within the CSI measurement setting, one or multiple CSI-RS resource sets selected from at least one resource setting, and one or multiple CSI-RS resources selected from at least one CSI-RS resource set.

As described above, for FR2 a suitable gNB beam can be determined from a beam sweep where the gNB transmit different DL-RS (CSI-RS or SSB) in different gNB beams, and the UE performs measurement on the DL-RS and reports the best DL-RS indexes (and corresponding measurement values) back to the gNB. What kind of measurements and reporting that the UE should perform during a gNB beam sweep is mainly defined by the parameters reportQuantity/reportQuantity-r16 and nrOfReportedRS/nrofReportedRS-ForSINR-r16 in the CSI reporting setting IE in TS 38.331.

By setting the parameter reportQuantity to either cri-RSRP or ssb-Index-RSRP (depending on if CSI-RS or SSB are used as DL-RS in the beam sweep) the UE will measure and report RSRP for the N gNB beams with highest RSRP. By setting the parameter reportQuantity-r16 to either cri-SINR-r16, or ssb-Index-SINR-r16 the UE will instead measure and report SINR for the N gNB beams with highest SINR. In addition, the network can determine the number of best gNB beams (N) that the UE should report during each gNB beam sweep by setting the parameter nrofReportedRS/nrofReportedRS-ForSINR-r16 to either 2 or 4 (if the fields are absent only the best beam is reported).

NR also includes uplink power control. Uplink power control is used to determine a proper transmit power for PUSCH, PUCCH and SRS to ensure that they are received by the gNB at an appropriate power level. The transmit power depends on the amount of channel attenuation, the noise and interference level at the gNB receiver, and the data rate in case of PUSCH or PUCCH.

The uplink power control in NR consists of two parts, i.e., open-loop power control and closed-loop power control. Open-loop power control is used to set the uplink transmit power based on the pathloss estimation and some other factors including the target receive power, channel/signal bandwidth, modulation and coding scheme (MCS), fractional power control factor, etc.

Closed-loop power control is based on explicit power control commands received from the gNB. The power control commands are typically determined based on some uplink measurements at the gNB on the actual received power. The power control commands may contain the difference between the actual and the target received powers. Either cumulative or non-cumulative closed-loop power adjustments are supported in NR. Up to two closed loops can be configured in NR for each uplink channel or signal. A closed loop adjustment at a given time is also referred as a power control adjustment state.

With multi-beam transmission in FR2, pathloss estimation needs to also reflect the beamforming gains corresponding to an uplink transmit and receive beam pair used for the uplink channel or signal. This is achieved by estimating the pathloss based on measurements on a DL-RS transmitted over the corresponding downlink beam pair. The DL-RS is referred to as a DL pathloss RS. A DL pathloss RS can be a CSI-RS or SSB. For the example shown in FIG. 6, when an uplink signal is transmitted in beam #1, CSI-RS #1 may be configured as the pathloss RS. Similarly, if an uplink signal is transmitted in beam #2, CSI-RS #2 may be configured as the pathloss RS.

For an uplink channel or signal (e.g., PUSCH, PUCCH, or SRS) to be transmitted in a uplink beam pair associated with a pathloss RS with index k, its transmit power in a transmission occasion i within a slot in a bandwidth part (BWP) of a carrier frequency of a serving cell and a closed-loop index l (l=0,1) can be expressed as $$P(i,k,l)=\min\begin{cases}P_{CMAX}(i)\\P_{open-loop}(i,k)+P_{closed-loop}(i,l)\end{cases}$$

where $P_{CMAX}(i)$ is the configured UE maximum output power for the carrier frequency of the serving cell in transmission occasion i for the UL channel or signal. $P_{open-loop}(i,k)$ is the open loop power adjustment and $P_{closed-loop}(i,l)$ is the closed loop power adjustment. $P_{open-loop}(i,k)$ is given below, $$P_{open-loop}(i,k)=P_O+P_{RB}(i)+\alpha PL(k)+\Delta(i)$$

where $P_O$ is the nominal target receive power for the uplink channel or signal and comprises a cell specific part $P_{O,cell}$ and a UE specific part $P_{O,UE}$, $P_{RB}(i)$ is a power adjustment related to the number of RBs occupied by the channel or signal in a transmission occasion i, PL(k) is the pathloss estimation based on a pathloss reference signal with index k, α is fractional pathloss compensation factor, and Δ(i) is a power adjustment related to MCS. $P_{closed-loop}(i,l)$ is given below:

$$P_{closed-loop}(i,l)=\begin{cases}P_{closed-loop}(i-i_0,l)+\sum_{m=0}^{M}\delta(m,l);\text{ if cumulation is enabled}\\\delta(i,l);\text{ if cumulation is disabled (i.e., absolute is enable)}\end{cases}$$

where δ(i,l) is a transmit power control (TPC) command value included in a DCI format associated with the uplink channel or signal at transmission occasion i and closed-loop l;

$$\sum_{m=0}^{M}\delta(m,l)$$

is a sum of TPC command values that the UE receives for the channel or signal and the associated closed-loop l since the TPC command for transmission occasion $i-i_0$.

Power control parameters $P_O$, $P_{RB}(i)$, α, PL, Δ(i), δ(i,l) are generally configured separately for each uplink channel or signal (e.g., PUSCH, PUCCH, and SRS) and may be different for different uplink channels or signals.

NR also includes power head room reporting. The uplink power availability at a UE, or power headroom (PHR), needs to be provided to the gNB. PHR reports are transmitted from the UE to the gNB when the UE is scheduled to transmit data on PUSCH. A PHR report can be triggered periodically or when certain conditions are met, such as when the difference between the current PHR and the last report is larger than a configurable threshold.

There are two different types of power-headroom reports defined in NR, i.e., Type 1 and Type 3. Type 1 power headroom reporting reflects the power headroom assuming PUSCH-only transmission on a carrier. PHR is a measure of the difference between $P_{CMAX}$ and the transmit power that would have been used for a PUSCH. A negative PHR indicates that the per-carrier transmit power is limited by $P_{CMAX}$ at the time of the power headroom reporting for the PUSCH.

The Type 1 PHR can be based on either an actual PUSCH transmission carrying the PHR report or a reference PUSCH transmission (aka, virtual PHR) if the time between a PHR report trigger and the corresponding PUSCH carrying the PHR report is too short for a UE to complete the PHR calculation based the actual PUSCH. The power control parameters for the reference PUSCH are pre-determined.

Type 3 power headroom reporting is used for uplink carrier switching in which a PHR is reported for a carrier that is not yet configured for PUSCH transmission but is configured only for SRS transmission. Similarly, a Type 3 PHR can be based on either an actual SRS transmission or a reference SRS transmission.

PHR report is per carrier and does not explicitly take beam-based operation into account.

NR also includes maximum permissible exposure (MPE). In 3GPP, two methods have been introduced to enable the UE to comply with regulatory exposure limits; reduced maximum output power (referred to as P-MPR) and reduced uplink transmission duty cycle.

For FR2, maxUplinkDutyCycle-FR2 is a UE capability and indicates the maximum percentage of symbols during is that can be scheduled for uplink transmission regulatory exposure limits.

In case the field of UE capability maxUplinkDutyCycle-FR2 is not present or is present but the percentage of uplink symbols transmitted within any 1 s evaluation period is larger than maxUplinkDutyCycle-FR2, the UE can apply P-MPR to meet the regulatory exposure limits. By applying P-MPR the UE can reduce the maximum output power for a UE power class with x number of dB (where the range of x is still being discussed in 3GPP). For example, for UE power class 2 with a P-MPR value x=10 dB the UE is allowed to reduce the maximum output power (Pcmax) from 23 dBm to 13 dBm (23 dBm−10 dB=13 dBm). Due to P-MPR and maxUplinkDutyCycle-FR2 the maximum uplink performance of a selected uplink transmission path can be significantly deteriorated.

Because the MPE issue may be highly directional in FR2, required P-MPR and maxUplinkDutyCycle may be uplink beam specific and may be different among different candidate uplink beams across different UE panels. That means that certain beams/panels, i.e. ones that may be pointing towards human body, may have potentially very high required P-MPR/low duty cycle while some other beams/ panels, i.e. ones of which beam pattern may not coincide human body, may have very low required P-MPR/high duty cycle.

For UEs the signals can arrive and emanate from all different directions, thus it is beneficial to have an antenna implementation at the UE which has the possibility to generate omni-directional-like coverage in addition to the high gain narrow beams used at mmWave frequencies to compensate for the poor propagation conditions. One way to increase the omni-directional coverage at a UE is to install multiple panels pointing in different directions as schematically illustrated in FIG. 12.

To reduce the complexity and heat generation at UEs at mmWave frequencies, two TX/RX chains may be implemented per UE at mmWave frequencies, and the two TX/RX chains are switched between the multiple UE panels depending on which UE panel that currently is best, as illustrated in FIG. 12.

Because MPE issues might occur for certain UE beams/UE panels (causing the UE to reduce the maximum output power for that UE beam/panel), the optimal beam pair link for downlink and uplink might differ. For example, a first beam pair link associated with a first UE panel might be best for downlink due to highest received power, however, due to MPE issues with that first UE panel, the optimal beam pair link for uplink might be associated with a second UE panel that does not suffer from MPE issues. Therefore, it might be optimal for a UE (with respect to both downlink and uplink performance) to connect the TX chains to one panel and the RX chains to another panel, as schematically illustrated in FIG. 13.

There currently exist certain challenges. For example, because of MPE issues and/or different power amplifier (PA) architectures per UE panel and/or different available uplink output power per panel depending on the generated beam width (in commercial UEs, wider beams at a UE panel are generated by turning off one or more antenna elements and corresponding PAs which will reduce the available maximum uplink output power for that panel), the available maximum uplink output power might differ between different UE panels/UE beams.

However, during a gNB beam sweep the UE only reports the measured RSRP (or SINR) related to downlink measurements, thus not taking potential reduced maximum output power for the corresponding UE panel/beam into account. This can lead to sub-optimal beam pair link selections with regards to uplink performance.

SUMMARY

As described above, certain challenges currently exist with fifth generation (5G) new radio (NR) beam reporting. Certain aspects of the present disclosure and their embodiments may provide solutions to these or other challenges. For example, in a gNB beam sweep report, particular embodiments include information about available maximum uplink output power (explicitly or implicitly) for the different reported beams (i.e., downlink reference signal (DL-RS) indexes) such that a gNB can determine suitable beam pair link for uplink. Particular embodiments include a report quantity defined in channel state information (CSI) report configuration that includes information about available uplink output power for each reported gNB beam during a gNB beam sweep.

According to some embodiments, a method performed by a wireless device for indicating an uplink performance metric in a beam sweep report comprises determining a downlink channel quality associated with each beam of a plurality of downlink beams, determining uplink performance metric associated with each beam of the plurality of downlink beams, selecting a subset of the plurality of downlink beams for reporting in a beam sweep report; and transmitting a beam sweep report to a network node based on the selected subset of downlink beams. The beam sweep report includes the uplink performance metric associated with each downlink beam in the subset of downlink beams.

In particular embodiments, the method further comprises obtaining an indication of a type of uplink performance metric to include in the beam sweep report.

In particular embodiments, the uplink performance metric comprises a relative maximum uplink link budget based on an available maximum uplink output power for the wireless device, a reduced maximum output power (P-MPR), a reference to a power headroom (PHR) value, a modified power headroom (PHR) value, a reference to a modified power headroom (PHR) value, and/or a maximum available uplink output power (MAUOP) value. The uplink performance metric may comprise an absolute value, a relative value, or a mixture of absolute value and relative value.

According to some embodiments, a wireless device comprises processing circuitry operable to perform any of the wireless device methods described above.

Also disclosed is a computer program product comprising a non-transitory computer readable medium storing computer readable program code, the computer readable program code operable, when executed by processing circuitry to perform any of the methods performed by the wireless device described above.

According to some embodiments, a method performed by a network node for receiving an uplink performance metric in a beam sweep report comprises receiving a beam sweep report from a wireless device. The beam sweep report comprises indications of a subset of downlink beams and an uplink performance metric associated with each downlink beam in the subset of downlink beams. The method further comprises selecting a beam to use for communication with the wireless device based on the beam sweep report.

In particular embodiments, the method further comprises transmitting to the wireless device an indication of a type of uplink performance metric to include in the beam sweep report.

According to some embodiments, a network node comprises processing circuitry operable to perform any of the network node methods described above.

Also disclosed is a computer program product comprising a non-transitory computer readable medium storing computer readable program code, the computer readable program code operable, when executed by processing circuitry to perform any of the methods performed by the network node described above.

Certain embodiments may provide one or more of the following technical advantages. For example, when a gNB selects beam pair links for uplink, it can take available maximum uplink output power into account for the candidate beam pair links, which improves the uplink performance.

BRIEF DESCRIPTION OF THE DRAWINGS

For a more complete understanding of the disclosed embodiments and their features and advantages, reference is now made to the following description, taken in conjunction with the accompanying drawings, in which:

FIG. 2 is a table illustrating slot length at different numerologies;

FIG. 8 is an example of a PUCCH spatial relation information element;

FIG. 9 is an example of SRS spatial relation information element;

DETAILED DESCRIPTION

Figure 1:
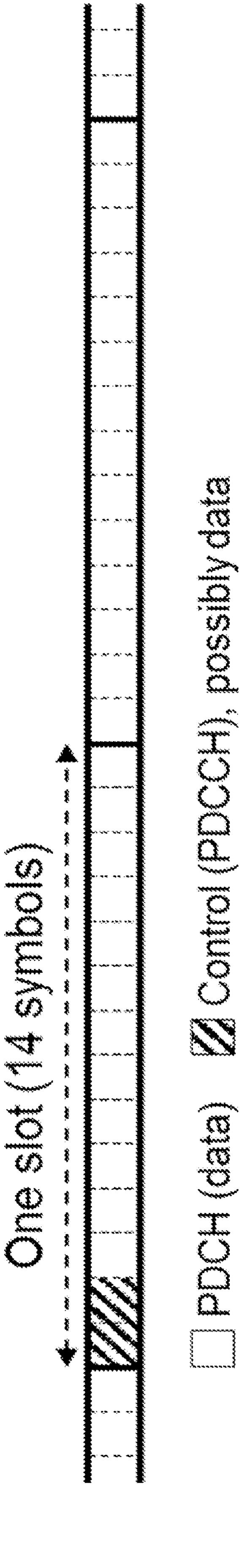
FIG. 1 illustrates NR time-domain structure with 15 kHz subcarrier spacing.
Figure 3:
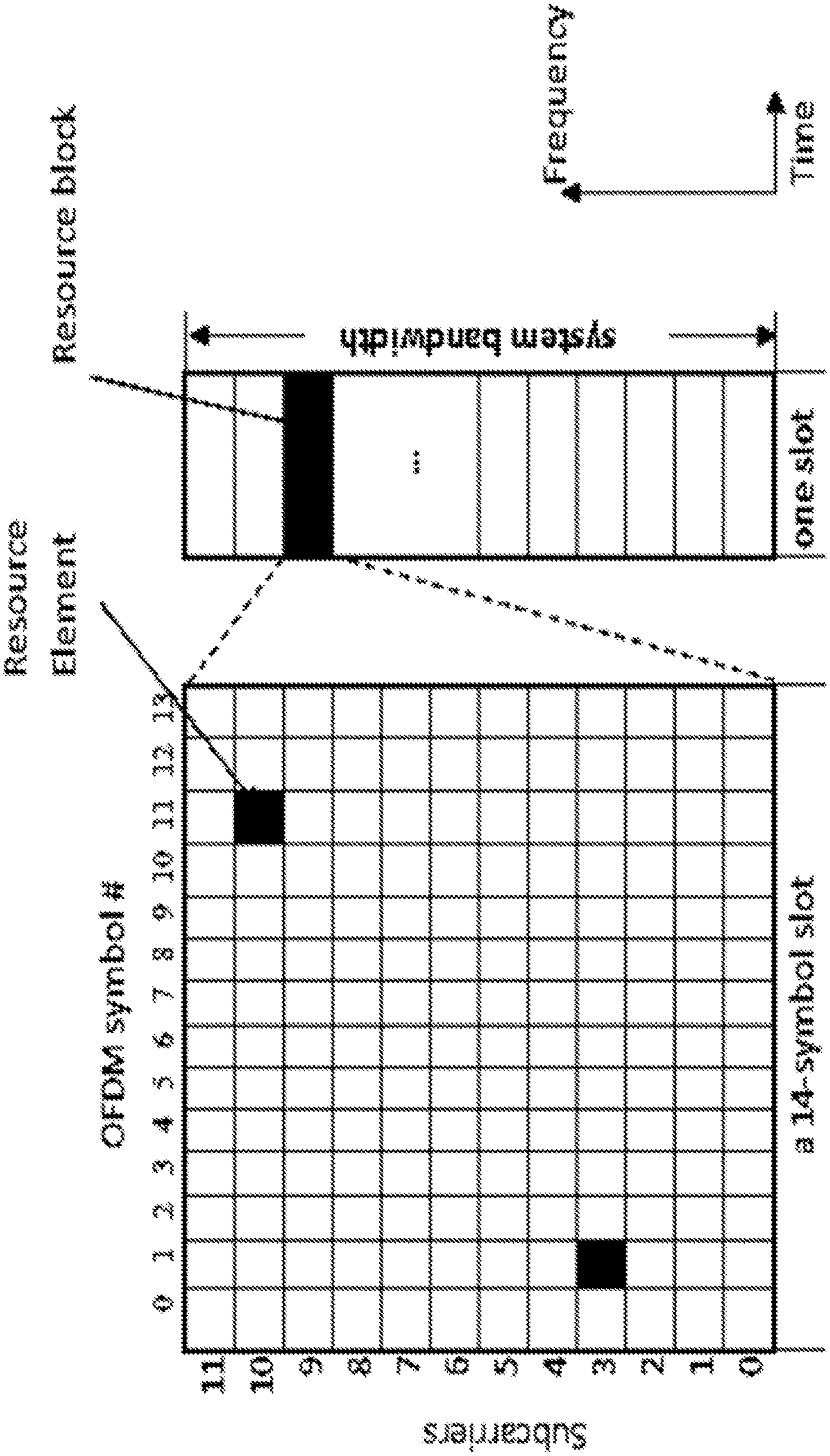
FIG. 3 is a time and frequency diagram illustrating the NR physical resource grid.
Figure 4:
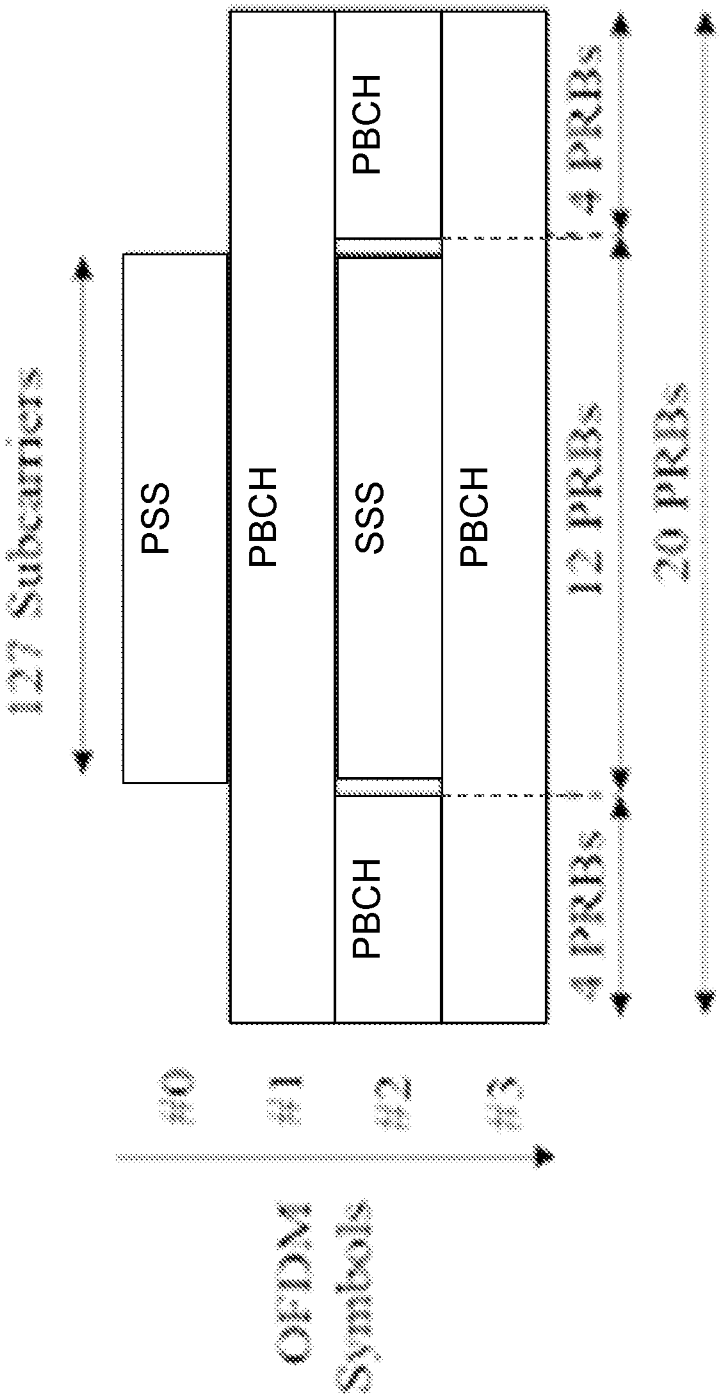
FIG. 4 illustrates the SSB structure.
Figure 5:
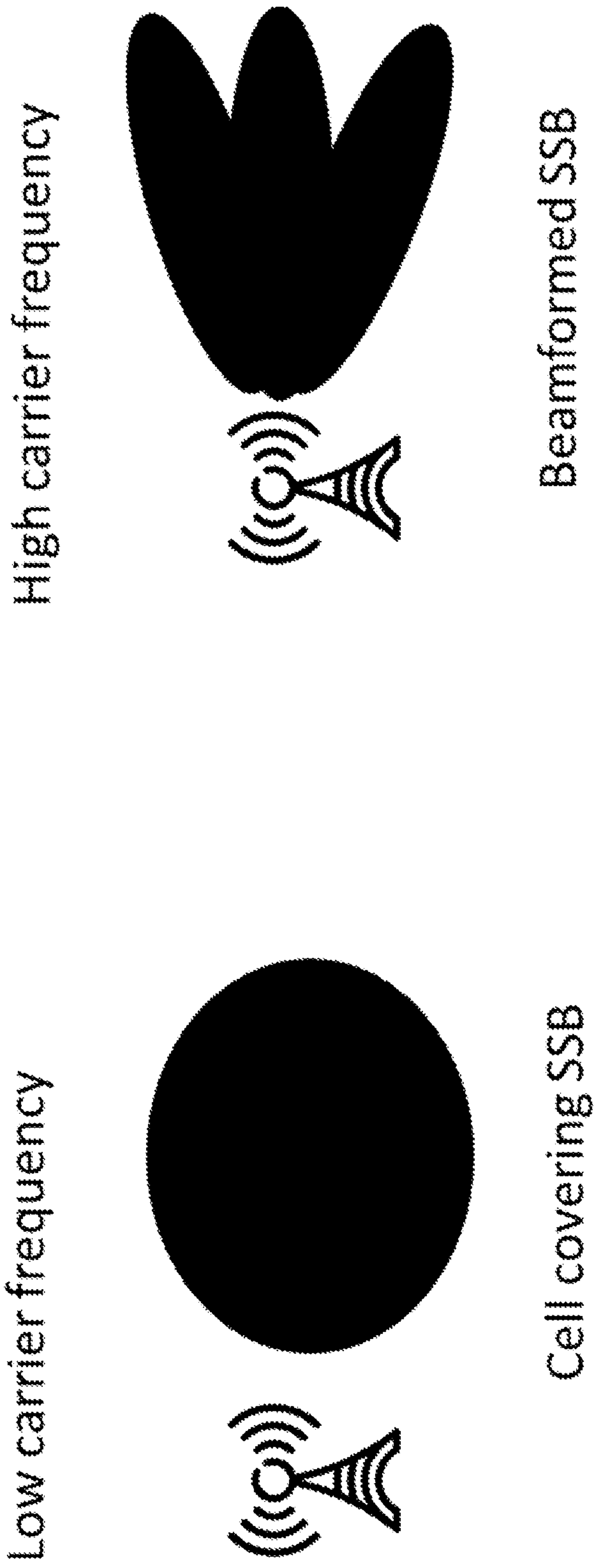
FIG. 5 illustrates an example of single SSB covering a cell (left) and multiple beamformed SSBs that together cover the cell (right)
Figure 6:
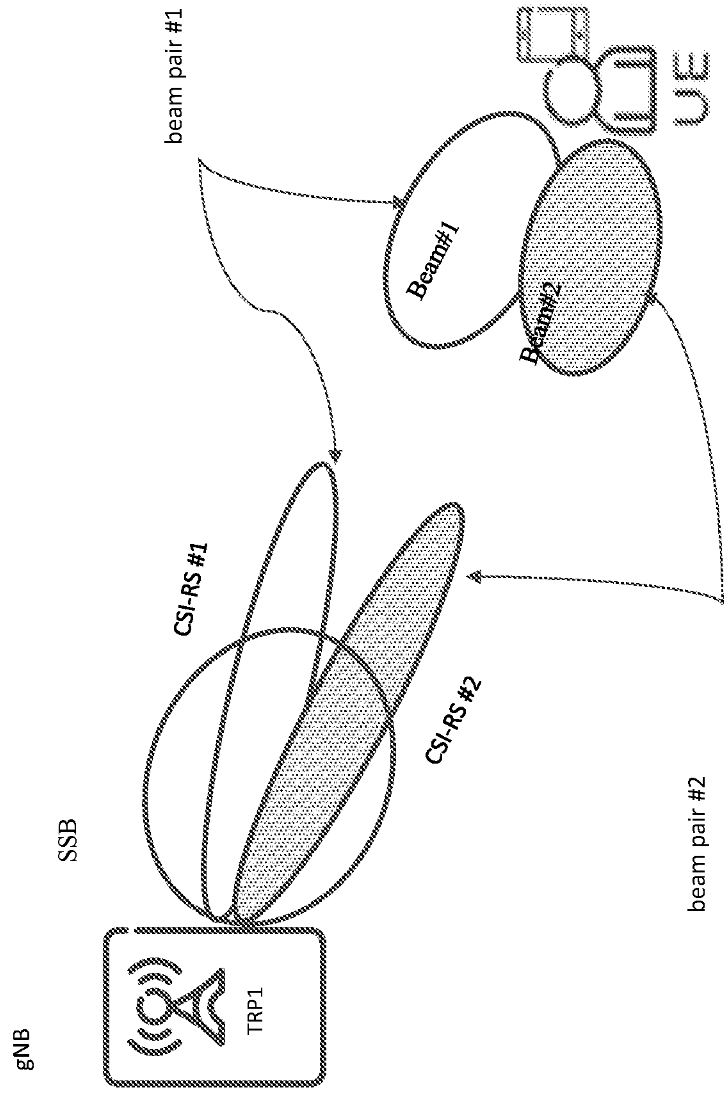
FIG. 6 illustrates an example of transmission and reception with multiple beams.
Figure 7:
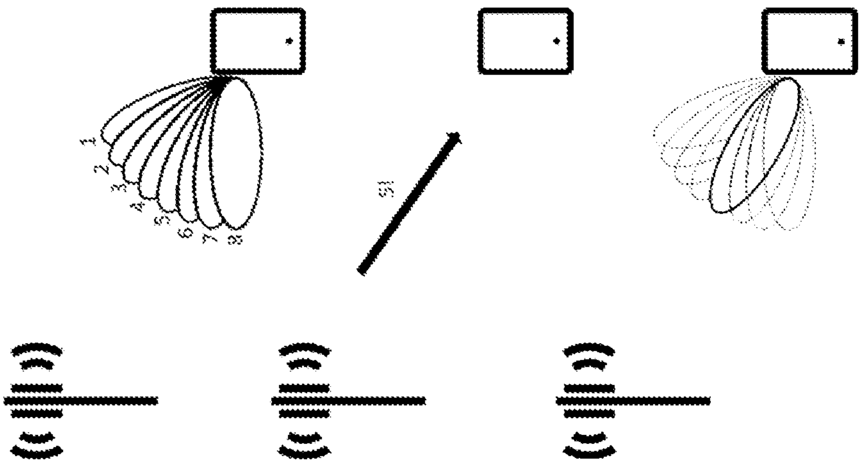
FIG. 7 illustrates beam management using an SRS sweep.
Figure 10:
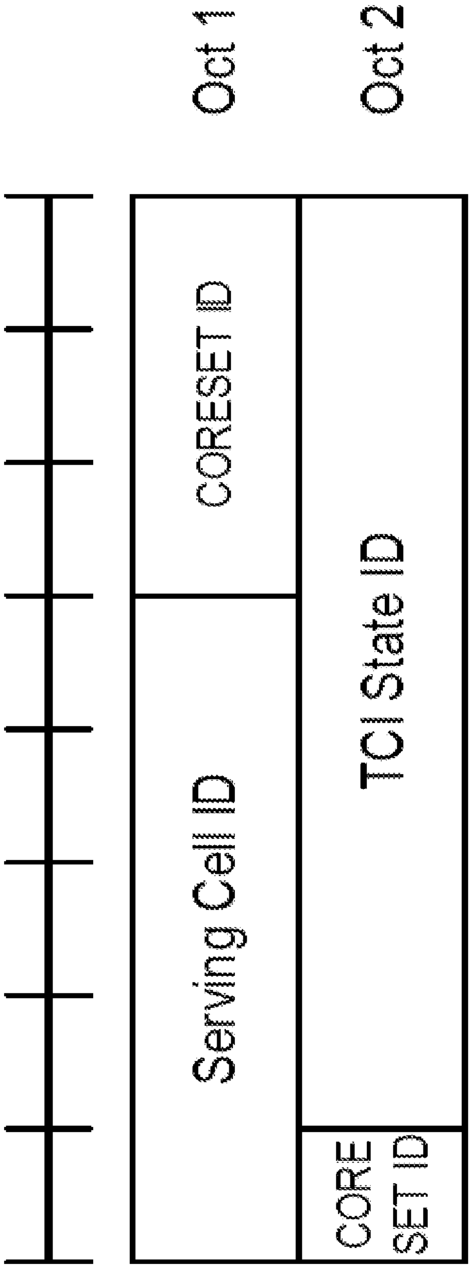
FIG. 10 illustrates a TCI state indication for UE-specific PDCCH MAC CE (extracted from FIG. 6.1.3.15-1 of 3GPP TS 38.321)
Figure 11:
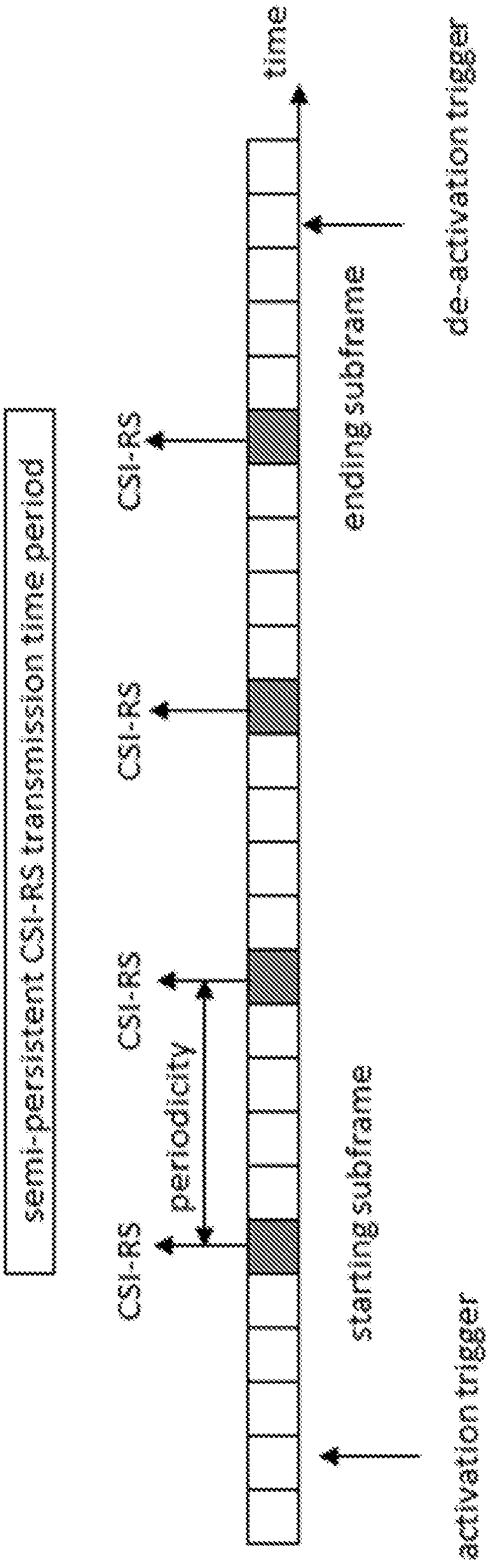
FIG. 11 illustrates semi-persistent CSI-RS transmission.
Figure 12:
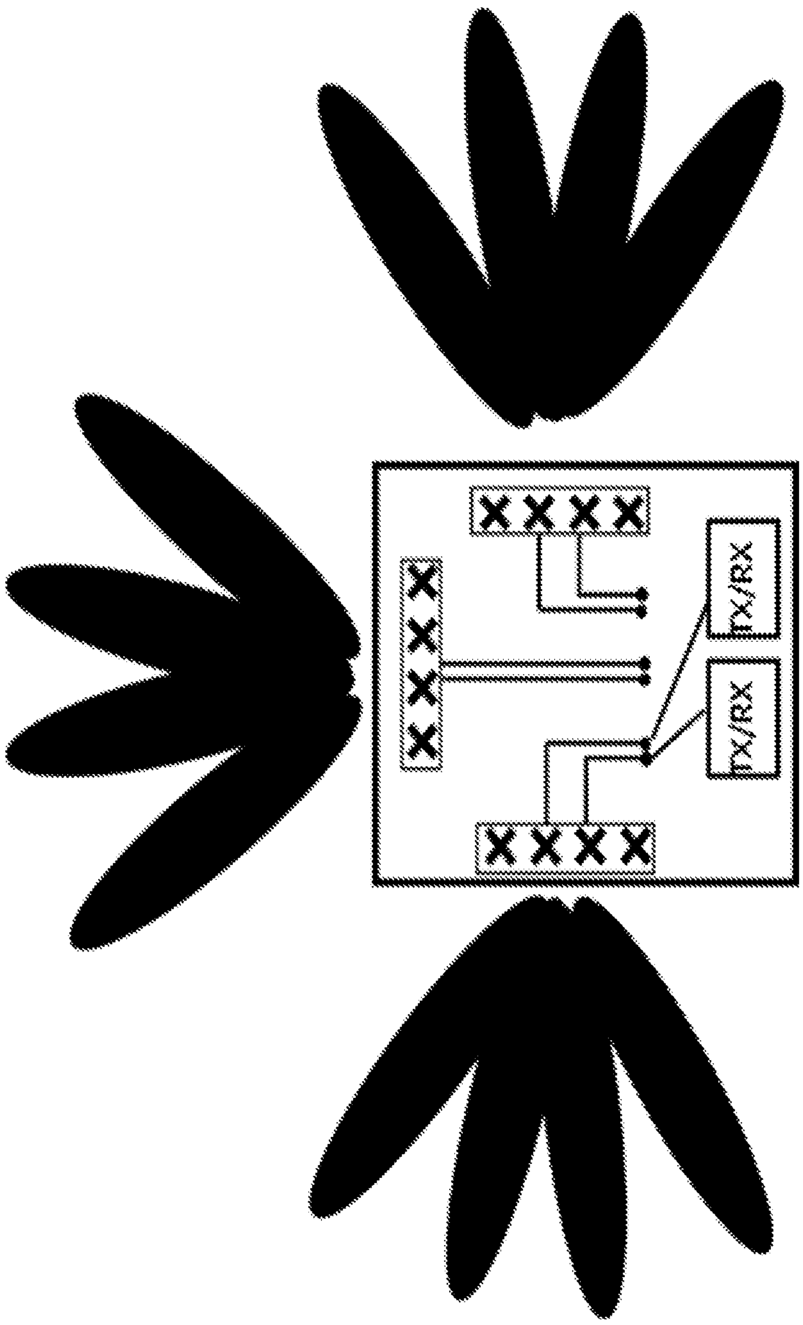
FIG. 12 is a schematic illustration of a UE with multiple antenna panels pointing in different directions to attain omni like coverage at mmWave frequencies.
Figure 13:
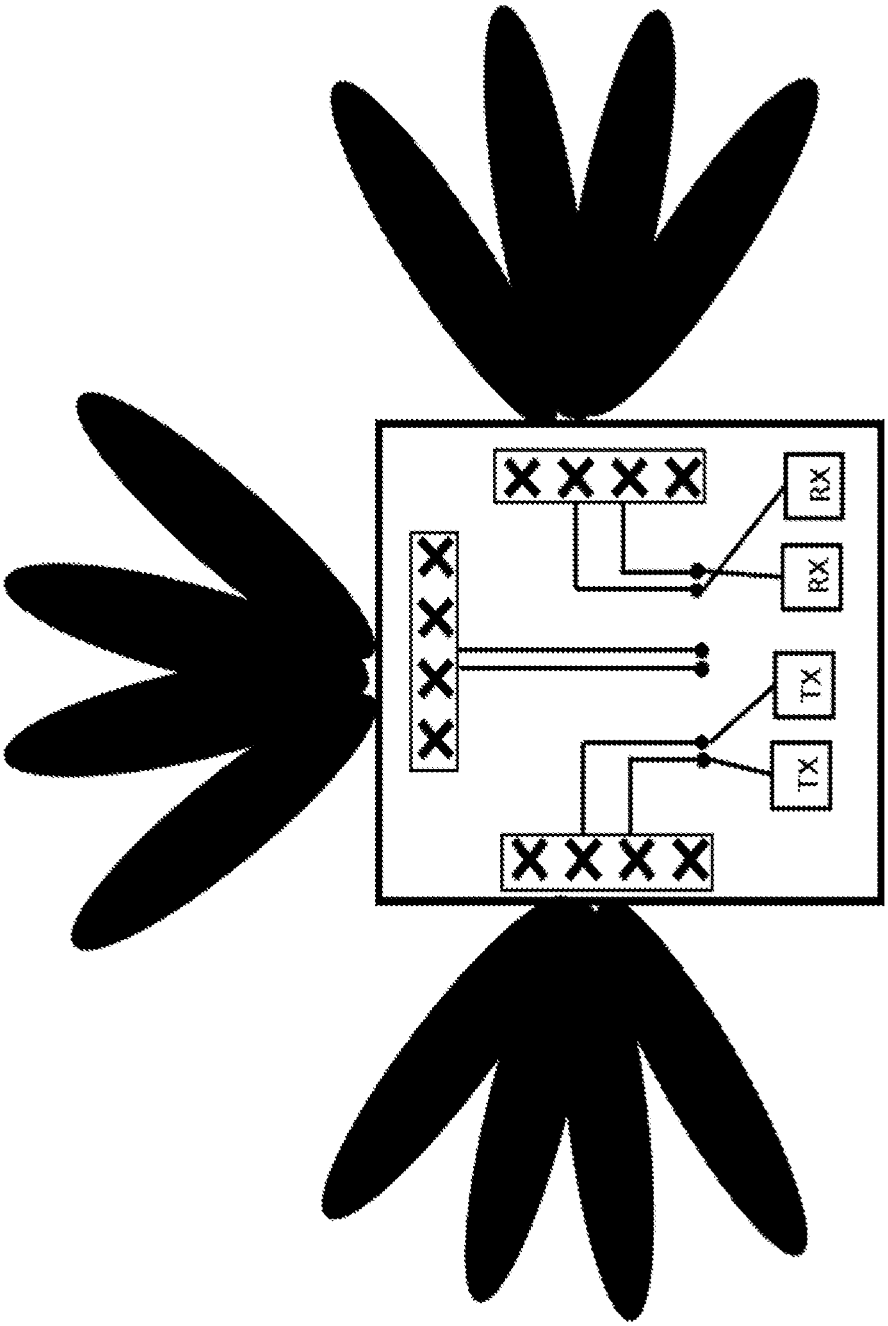
FIG. 13 is a schematic illustration where two TX/RX chains are switched between the three antenna panels, and where the two TX chains and two RX chains are connected to different UE antenna panels.

As described above, certain challenges currently exist with fifth generation (5G) new radio (NR) beam reporting. Certain aspects of the present disclosure and their embodiments may provide solutions to these or other challenges. For example in a gNB beam sweep report, particular embodiments include information about available maximum uplink output power (explicitly or implicitly) for the different reported beams (i.e., downlink reference signal (DL-RS) indexes) such that a gNB can determine suitable beam pair link for uplink. Particular embodiments include a report quantity defined in channel state information (CSI) report configuration that includes information about available uplink output power for each reported gNB beam during a gNB beam sweep.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In a first group of embodiments, a user equipment (UE) includes explicit uplink output power related information in a gNB beam sweep report. In one example, the CSI report configuration IE includes a new report quantity. The new report quantity indicates to the UE to include in the gNB beam sweep report uplink output power information associated with each reported gNB beam (DL-RS index) in the gNB beam sweep report.

Below is a list of different examples of uplink related output power information that may be included in a gNB beam sweep report:

A P-MPR value may be signaled per reported DL-RS index indicating how much the maximum allowed uplink output power (i.e., Pcmax) is reduced due to unwanted emission for the UE panel/UE beam that was used when receiving that DL-RS.

For example, assume that Pcmax for the UE is 23 dBm, and that P-MPR for the UE panel/UE beam used to receive a certain DL-RS is 4 dB. When the UE reports the P-MPR value of 4 dB in the beam report for the DL-RS index, the gNB then knows that if it selects the beam pair link associated with the DL-RS index for uplink transmission, the maximum allowed uplink output power would be 19 dBm instead of 23 dBm.

One drawback with reporting the P-MPR is that the gNB might not get the full information regarding the available maximum uplink output power for the beam pair link, because P-MPR does not contain information regarding the maximum available power amplifier (PA) output power for the UE panel/UE beam. For example, if the UE uses a wide beam by turning off 3 out of 4 PAs on the UE panel, the available output power might be 23 dBm−6 dB=17 dBm, instead of the reported 19 dBm. In addition, when the UE has 20 dBm PAs instead of 23 dBm PAs, the available output power when using the wide beam would be 20 dBm−6 dB=14 dBm. Therefore, signaling the P-MPR might lead to incomplete information about available maximum uplink output power.

In some embodiments, a modified power headroom (PHR) value is signaled per reported DL-RS index indicating the actual remaining available uplink output power assuming a reference physical uplink shared channel (PUSCH) transmission (the reference PUSCH transmission should preferably assume a certain modulation and coding scheme (MCS), resource block allocation and TPMI, because it is possible that no prior PUSCH transmission has been performed on a certain beam pair link associated with the DL-RS indexes included in the beam report). The modified PHR value may, for example, be calculated as the actual available uplink output power (based on available PA power and P-MPR for the used UE panel/UE beam, instead of Pcmax) minus the needed output power for the reference PUSCH assumptions based on some power control loop calculations (with the associated reported DL-RS as path loss reference signal). In some embodiments, the actual PUSCH MCS and frequency allocation are used for the PHR report if PUSCH has be transmitted before on the associated beam pair links.

For example, assume that Pcmax for the UE is 23 dBm, but the maximum available uplink output power for the UE panel/UE beam used to receive the DL-RS is 14 dBm. Assume further that the required uplink transmission power for the reference PUSCH transmissions (calculated based on some default power control loop parameters with the reported DL-RS as path loss reference signal) is 18 dBm. Then the modified PHR value signaled in the gNB beam sweep report for that DL-RS index would be 14 dBm−18 dBm=−4 dB, i.e. 4 dB output power is missing to transmit the reference PUSCH.

Note that a normal PHR report uses Pcmax as reference, however that could be misleading because the available output power for the associated UE panel/UE beam might be significantly lower than Pcmax. Therefore, it is preferred the modified PHR is signaled (as described above) instead a normal PHR.

In some embodiments, a maximum available uplink output power (MAUOP) value is signaled per reported DL-RS index where the MAOP is taking both the available PA output power and P-MPR for that UE panel/UE beam into account. The MAUOP may, for example, be calculated as min(maximum available PA output power, Pcmax-P-MPR).

As long as the DL-RSRP is signaled for each reported DL-RS beam, the MAUOP will result in the same information for the gNB as reporting the modified PHR value described above. A difference is that the UE does not have to make any assumptions regarding reference PUSCH transmissions or default power control loop.

Some embodiments include a reference to a certain power head room reports (PHR). The UE may provide the network with multiple PHRs. Each beam is then associated with one of the PHRs. In this case, a reference to the corresponding PHR can be reported per DL-RS.

For example, if the UE provides 2 PHRs, the UE includes a reference to the corresponding PHR with each DL-RS.

In a second group of embodiments, a UE includes uplink related performance measure taking available uplink output power into account in a gNB beam sweep report. For example, the UE may include an uplink performance metric for each reported DL-RS index in a gNB beam sweep report. One metric of uplink performance may, for example be, "relative maximum plink link budget", where "relative maximum uplink link budget" can be calculated by adding the measured DL RSRP and the available maximum uplink output power for the UE panel/UE beam used to receive the DL-RS. For example, assume that DL-RSRP is −100 dBm for a certain DL-RS and that the available maximum uplink output power for the UE panel/UE beam used during the RSRP measurements for that DL-RS has an available maximum uplink output power of 10 dBm, then the "relative maximum uplink link budget" may be calculated as; −100 dBm+10 dBm=−90 dBm.

This embodiment may be useful, for example, if the network would like to determine a best beam pair link in downlink based on SINR and a best beam pair link in uplink based on coverage/link budget. This might be suitable because uplink is more coverage limited (noise limited) while downlink is more interference limited. So, in this case, a gNB beam sweep report can contain N number of DL-RS indexes, where for each DL-RS index there is one DL-SINR value and one uplink performance value, for example "relative maximum uplink link budget".

In some embodiments, instead of indicating absolute values of available maximum uplink output power or absolute values of an uplink performance metric for each reported DL-RS index in a beam report, relative values may be used for some or all of the reported DL-RS indexes. In many cases this is enough because for the gNB to determine a best beam pair link for uplink transmission, the gNB only needs to know the beam pair link that has best uplink link budget.

Figure 14:
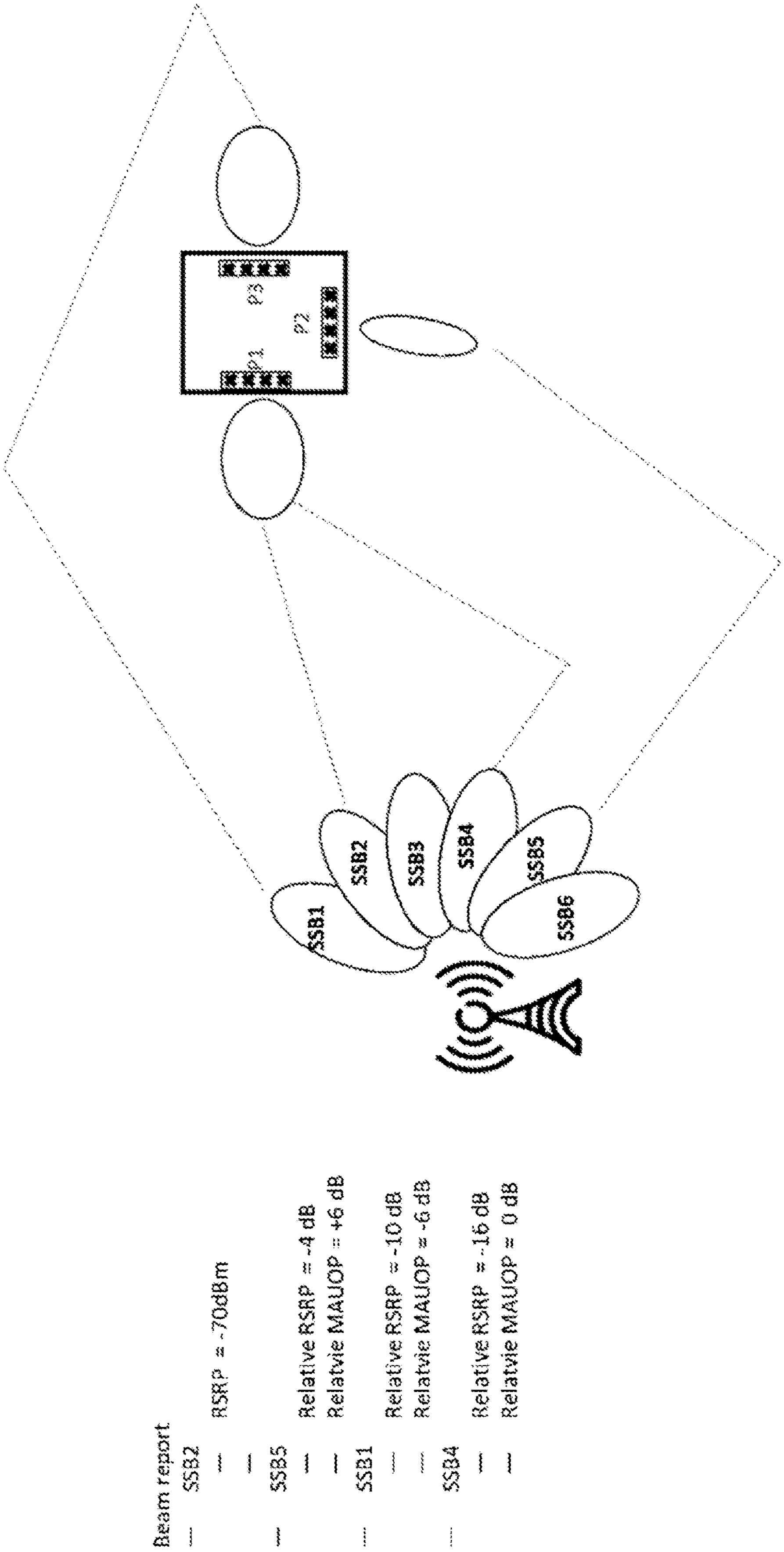
FIG. 14 illustrates one example of a gNB beam sweep report, according to particular embodiments.

In one example, that can be calculated based on the reported DL RSRP per reported DL-RS index plus the relative available maximum uplink output power for each reported DL-RS index. FIG. 14 illustrates one example of a gNB beam sweep report where MAUOP is reported together with DL RSRP for the four gNB beams with highest measured DL-RSRP. In this example MOUAP is not reported for the first gNB beam (SSB2) because it is enough to report relative values of MOUAP. In this example, beam pair link associated with SSB2 is best for downlink, while the beam pair link associated with SSBS is best for uplink (with respect to uplink link budget), because 6 dB extra uplink output power is available compared to the beam pair link associated with SSB2. The 6 dB extra uplink output power could be due to available PA output power and/or P-MPR for the associated UE panel/UE beam.

In particular embodiments, a UE may include the above-mentioned reports under gNB request only if certain criteria are met. One example of the criteria may be the output power difference associated with DL-RS is larger than certain threshold value. Another example of the criteria may be a number of times the output power difference being observed larger than the threshold, within a time duration, where the threshold can be configured by higher layer or a pre-defined fixed value. In these examples, the values for threshold, number of times and time duration can either be configured by higher layer or be pre-defined fixed values. The range of the values can be dependent on the numerology of the active BWP and UE capability.

Figure 15:
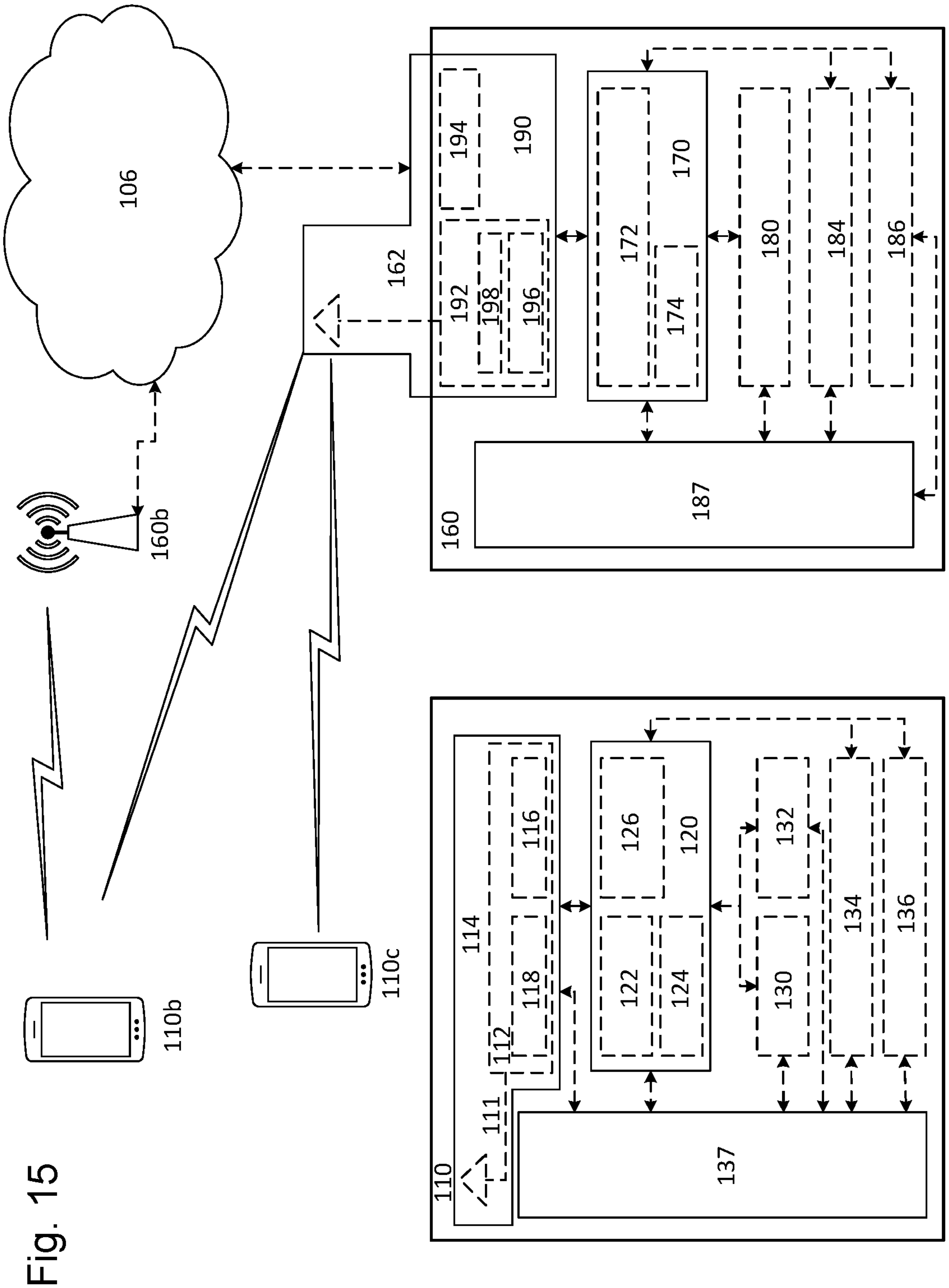
FIG. 15 is a block diagram illustrating an example wireless network.

Although the subject matter described herein may be implemented in any appropriate type of system using any suitable components, the embodiments disclosed herein are described in relation to a wireless network, such as the example wireless network illustrated in FIG. 15.

FIG. 15 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations.

A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 15, network node 160 includes processing circuitry 170, device readable medium 180, interface 190, auxiliary equipment 184, power source 186, power circuitry 187, and antenna 162. Although network node 160 illustrated in the example wireless network of FIG. 15 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 15 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 15. For simplicity, the wireless network of FIG. 15 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device.

Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 16:
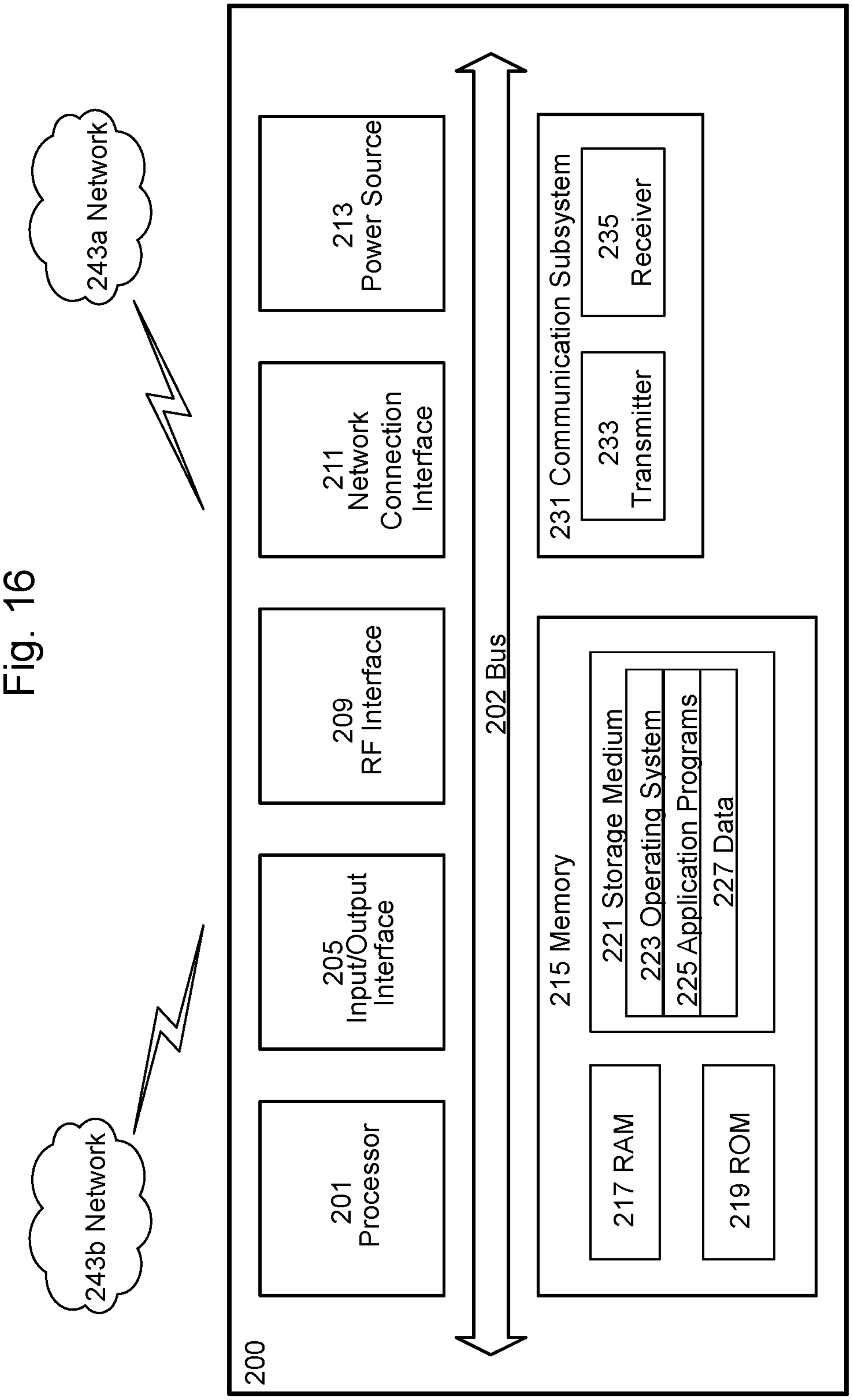
FIG. 16 illustrates an example user equipment, according to certain embodiments.

FIG. 16 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3$^{rd}$ Generation Partnership Project (3GPP), including a NB-IoT UE, a machine type communication (MTC) UE, and/or an enhanced MTC (eMTC) UE. UE 200, as illustrated in FIG. 16, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 16 is a UE, the components discussed herein are equally applicable to a WD, and vice-versa.

In FIG. 16, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may use all the components shown in FIG. 16, or only a subset of the components. The level of integration between the components may vary from one UE to another UE. Further, certain UEs may contain multiple instances of a component, such as multiple processors, memories, transceivers, transmitters, receivers, etc.

In FIG. 16, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 16, RF interface 209 may be configured to provide a communication interface to RF components such as a transmitter, a receiver, and an antenna. Network connection interface 211 may be configured to provide a communication interface to network **243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211** may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (MINIM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 16, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 17A:
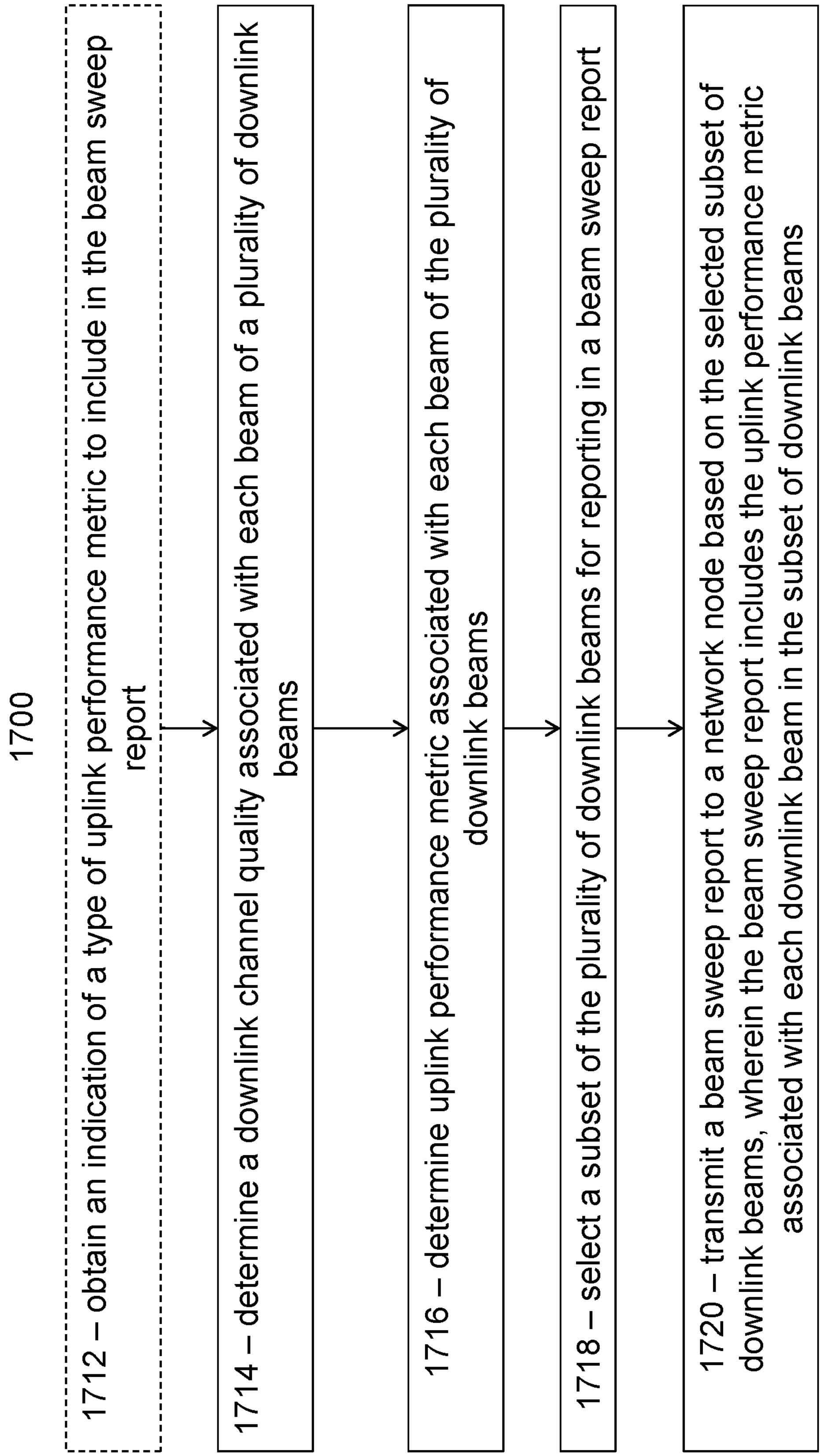
FIG. 17A is flowchart illustrating an example method in a wireless device, according to certain embodiments.

FIG. 17A is a flowchart illustrating an example method in a wireless device, according to certain embodiments. In particular embodiments, one or more steps of FIG. 17A may be performed by wireless device 110 described with respect to FIG. 15.

The method may begin at step 1712, where the wireless device (e.g., wireless device 110) obtains an indication of a type of uplink performance metric to include in the beam sweep report. The indication may include any of the performance metric types described herein.

At step 714, the wireless device determines a downlink channel quality associated with each beam of a plurality of downlink beams. For example, the wireless device may measure RSRP, RSRQ, and/or SINR associated with each downlink reference signal.

At step 716, the wireless device determines uplink performance metric associated with each beam of the plurality of downlink beams. In particular embodiments, the uplink performance metric is based on available uplink power for a beam associated with the downlink reference signal.

In particular embodiments, the uplink performance metric comprises a relative maximum uplink link budget based on an available maximum uplink output power for the wireless device, a reduced maximum output power (P-MPR), a reference to a power headroom (PHR) value, a modified power headroom (PHR) value, a reference to a modified power headroom (PHR) value, and/or a maximum available uplink output power (MAUOP) value. The uplink performance metric may comprise an absolute value, a relative value, or a mixture of absolute value and relative value.

At step 718, the wireless device selects a subset of the plurality of downlink beams for reporting in a beam sweep report. For example, the wireless device may select some number of beams based on a threshold or preference value.

At step 1720, the wireless device transmits a beam sweep report to a network node based on the selected subset of downlink beams. The beam sweep report includes the uplink performance metric associated with each downlink beam in the subset of downlink beams.

Modifications, additions, or omissions may be made to method 1700 of FIG. 17A. Additionally, one or more steps in the method of FIG. 17A may be performed in parallel or in any suitable order.

Figure 17B:
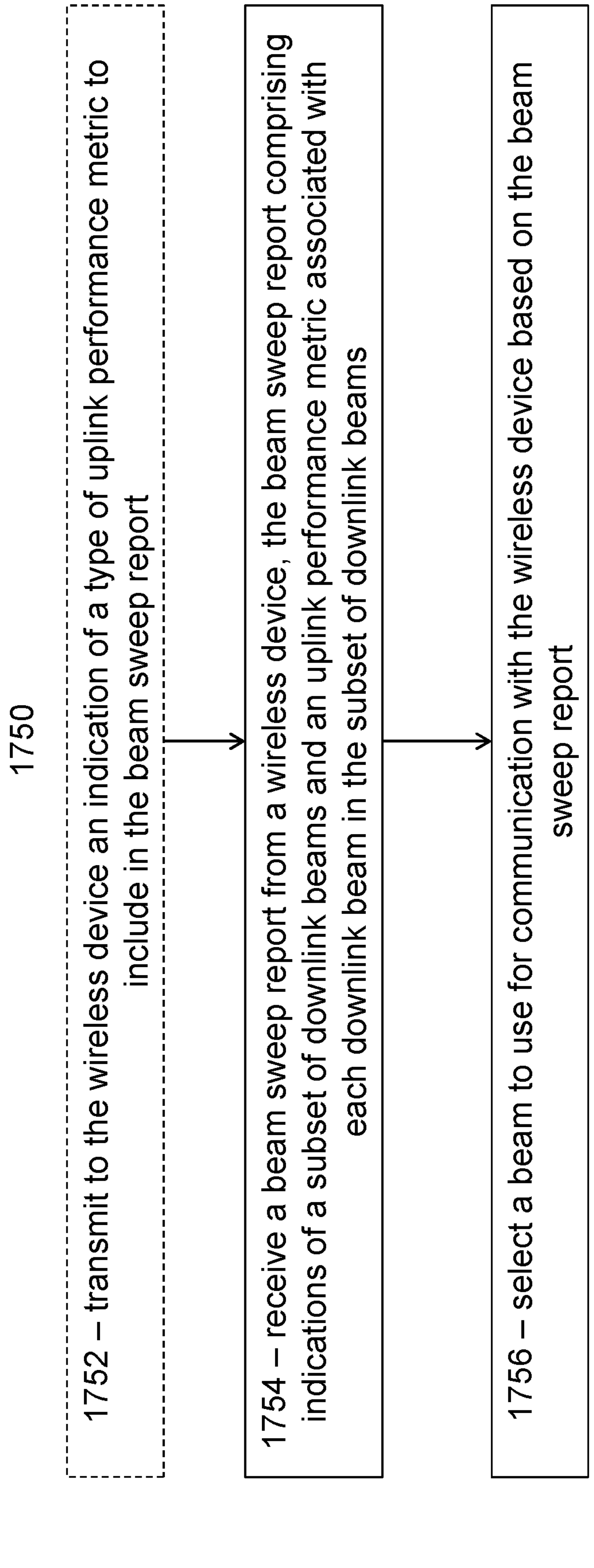
FIG. 17B is flowchart illustrating an example method in a network node, according to certain embodiments.

FIG. 17B is a flowchart illustrating an example method in a network node, according to certain embodiments. In particular embodiments, one or more steps of FIG. 17B may be performed by wireless device 110 described with respect to FIG. 15.

The method may begin at step 1752, where the network node (e.g., network node 160) transmits to the wireless device an indication of a type of uplink performance metric to include in the beam sweep report. The type of uplink performance metric are described with respect to FIG. 17A and according to any of the embodiments and examples described herein.

At step 1754, the network node receives a beam sweep report from a wireless device. The beam sweep report comprises indications of a subset of downlink beams and an uplink performance metric associated with each downlink beam in the subset of downlink beams. The beam sweep report is described with respect to FIG. 17A and any of the embodiments and examples described herein.

At step 1756, the network node selects a beam to use for communication with the wireless device based on the beam sweep report. The network node may select, for example, a beam that provides the best tradeoff between uplink and downlink performance.

Modifications, additions, or omissions may be made to method 1750 of FIG. 17B. Additionally, one or more steps in the method of FIG. 17B may be performed in parallel or in any suitable order.

Figure 18:
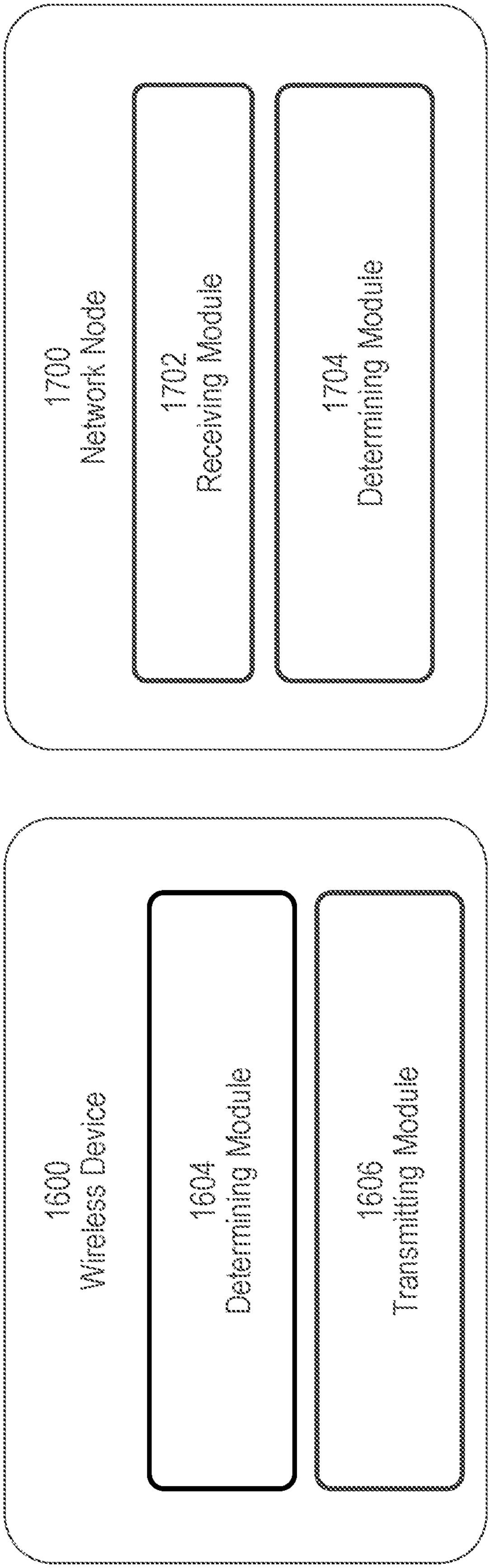
FIG. 18 illustrates a schematic block diagram of a wireless device and network node in a wireless network, according to certain embodiments.

FIG. 18 illustrates a schematic block diagram of two apparatuses in a wireless network (for example, the wireless network illustrated in FIG. 15). The apparatuses include a wireless device and a network node (e.g., wireless device 110 and network node 160 illustrated in FIG. 15). Apparatuses 1600 and 1700 are operable to carry out the example methods described with reference to FIGS. 17A and 17B, respectively, and possibly any other processes or methods disclosed herein. It is also to be understood that the methods of FIGS. 17A and 17B are not necessarily carried out solely by apparatuses 1600 and/or 1700. At least some operations of the methods can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause determining module 1604, transmitting module 1606, and any other suitable units of apparatus 1600 to perform corresponding functions according one or more embodiments of the present disclosure. Similarly, the processing circuitry described above may be used to cause receiving module 1702, determining module 1704, and any other suitable units of apparatus 1700 to perform corresponding functions according one or more embodiments of the present disclosure.

As illustrated in FIG. 18, apparatus 1600 includes determining module 1604 configured to determine downlink and uplink metrics associated with a plurality of beam pairs according to any of the embodiments and examples described herein. Transmitting module 1606 is configured to transmit a beam sweep report according to any of the embodiments and examples described herein.

As illustrated in FIG. 18, apparatus 1700 includes receiving module 1702 configured to receive a beam sweep report according to any of the embodiments and examples described herein. Determining module 1704 is configured to select a beam according to any of the embodiments and examples described herein.

Figure 19:
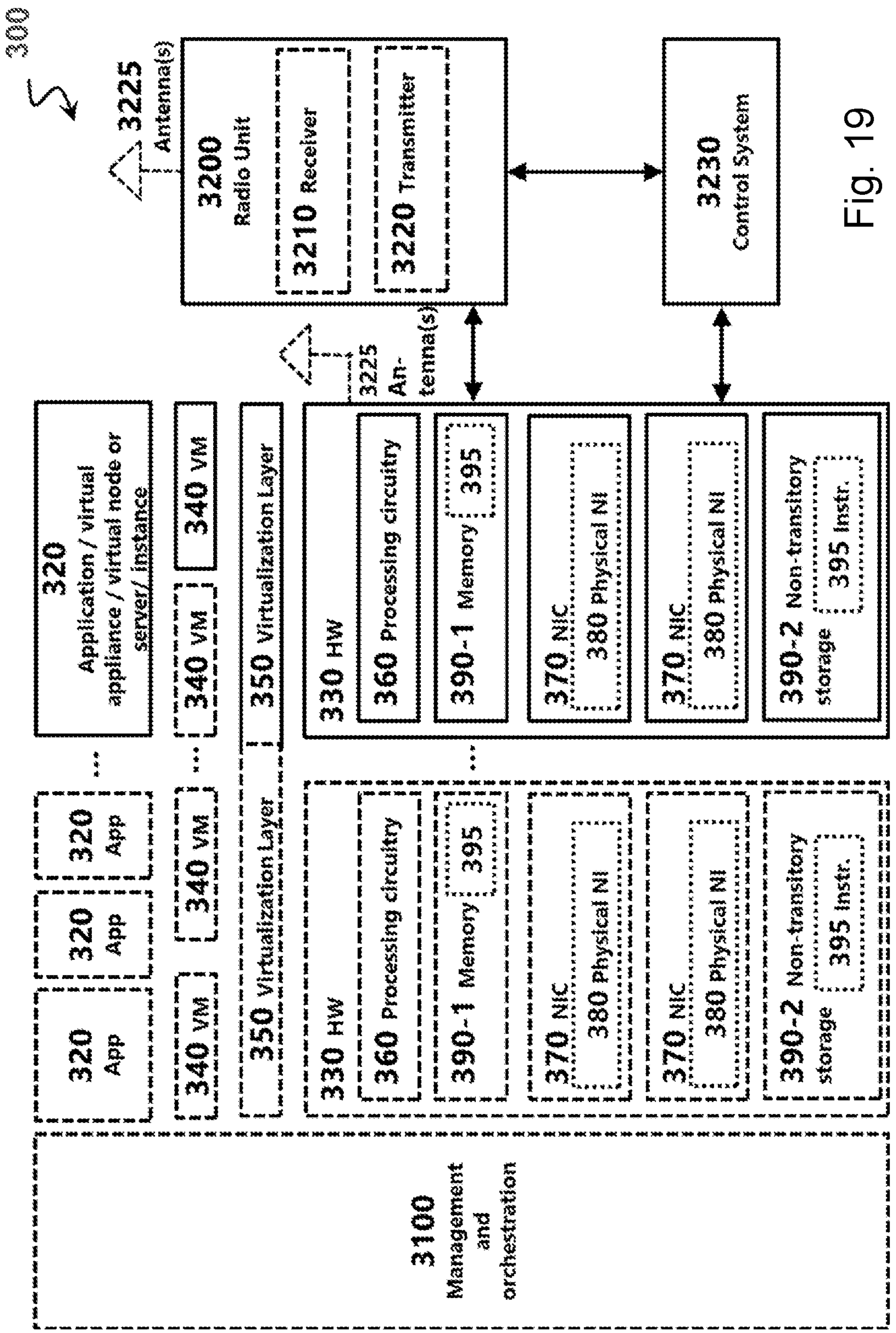
FIG. 19 illustrates an example virtualization environment, according to certain embodiments.

FIG. 19 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 19, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Figure 20:
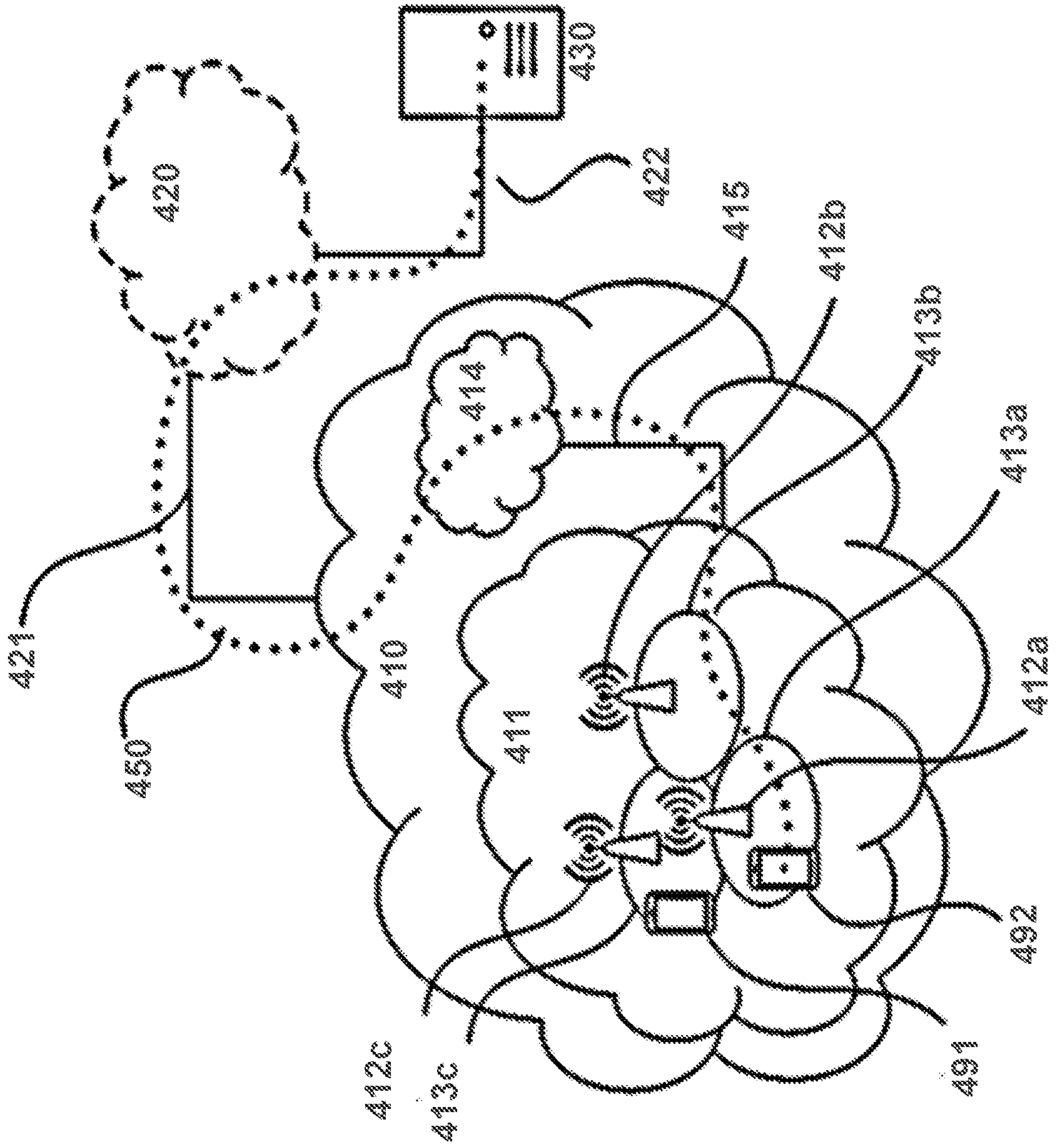
FIG. 20 illustrates an example telecommunication network connected via an intermediate network to a host computer, according to certain embodiments.

Still in the context of NFV, Virtual Network Function (VNF) is responsible for handling specific network functions that run in one or more virtual machines 340 on top of hardware networking infrastructure 330 and corresponds to application 320 in FIG. 20.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

With reference to FIG. 20, in accordance with an embodiment, a communication system includes telecommunication network 410, such as a 3GPP-type cellular network, which comprises access network 411, such as a radio access network, and core network 414. Access network 411 comprises a plurality of base stations 412*a*, 412*b*, 412*c*, such as NBs, eNBs, gNBs or other types of wireless access points, each defining a corresponding coverage area 413*a*, 413*b*, 413*c*. Each base station 412*a*, 412*b*, 412*c* is connectable to core network 414 over a wired or wireless connection 415. A first UE 491 located in coverage area 413*c* is configured to wirelessly connect to, or be paged by, the corresponding base station 412*c*. A second UE 492 in coverage area 413*a* is wirelessly connectable to the corresponding base station 412*a*. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 20 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 21:
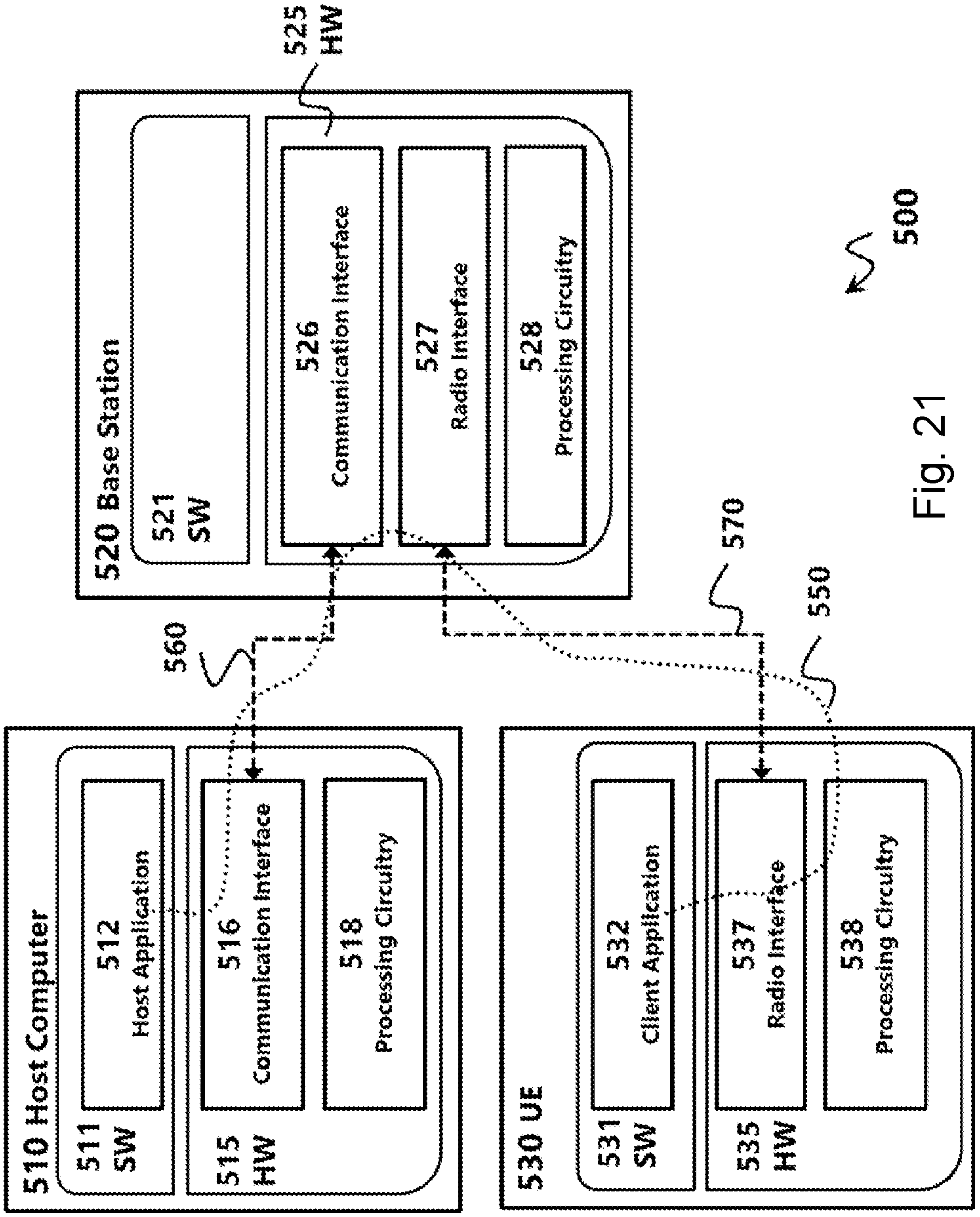
FIG. 21 illustrates an example host computer communicating via a base station with a user equipment over a partially wireless connection, according to certain embodiments.

FIG. 21 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 21. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 21) served by base station 520. Communication interface 526 may be configured to facilitate connection 560 to host computer

510. Connection 560 may be direct, or it may pass through a core network (not shown in FIG. 21) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 21 may be similar or identical to host computer 430, one of base stations 412*a*, 412*b*, 412*c* and one of UEs 491, 492 of FIG. 20, respectively. This is to say, the inner workings of these entities may be as shown in FIG. 21 and independently, the surrounding network topology may be that of FIG. 20.

In FIG. 21, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, and thereby provide benefits such as reduced user waiting time, better responsiveness and extended battery life.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 22:
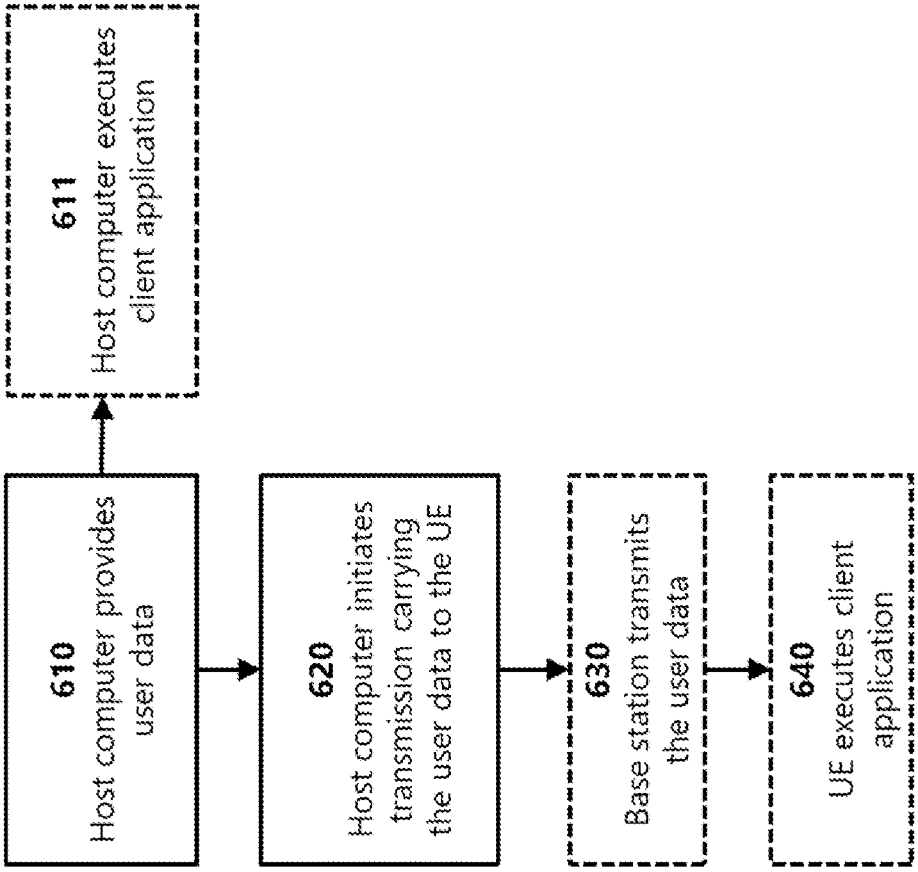
FIG. 22 is a flowchart illustrating a method implemented, according to certain embodiments.

FIG. 22 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 22 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 23:
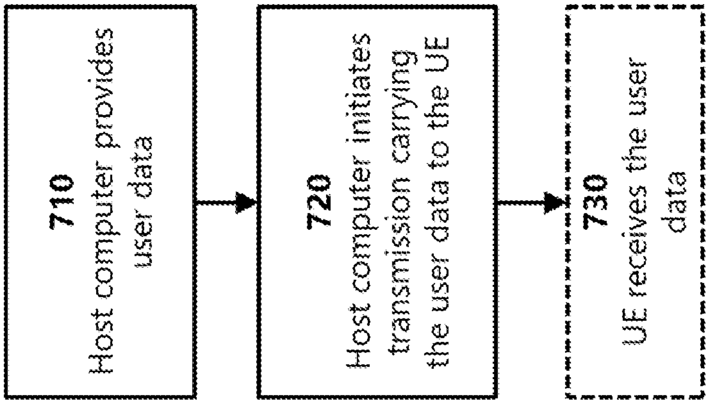
FIG. 23 is a flowchart illustrating a method implemented in a communication system, according to certain embodiments.

FIG. 23 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 23 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 24:
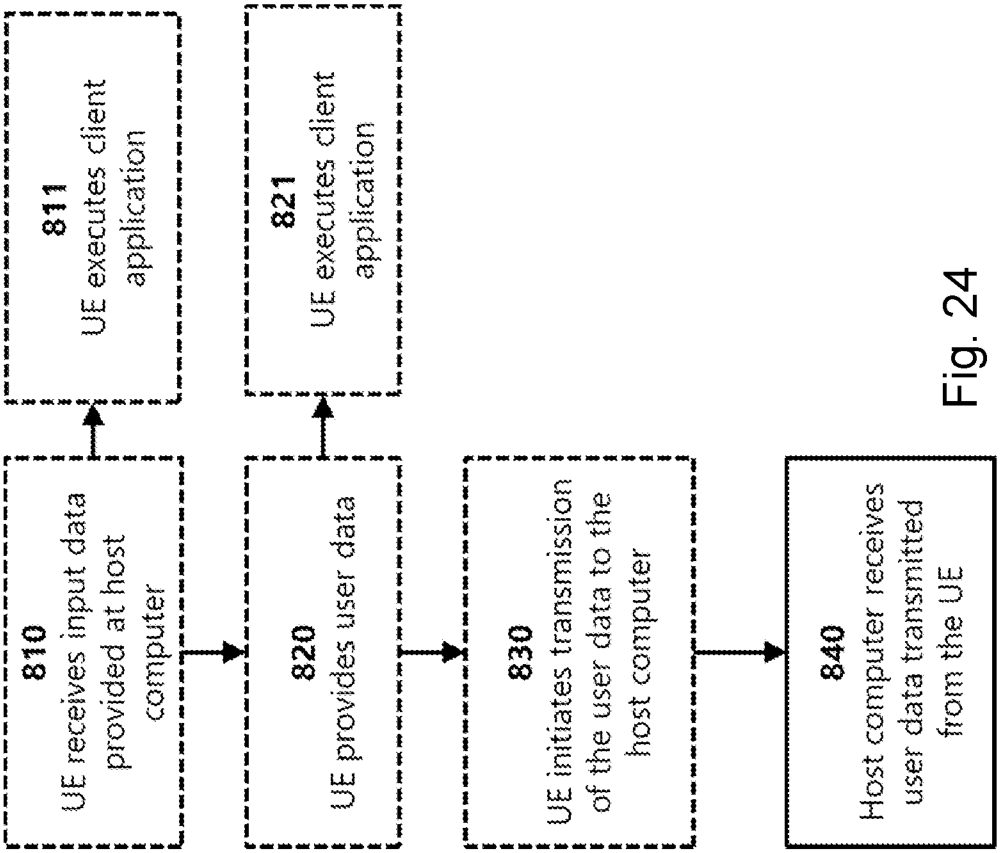
FIG. 24 is a flowchart illustrating a method implemented in a communication system, according to certain embodiments.

FIG. 24 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 24 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 25:
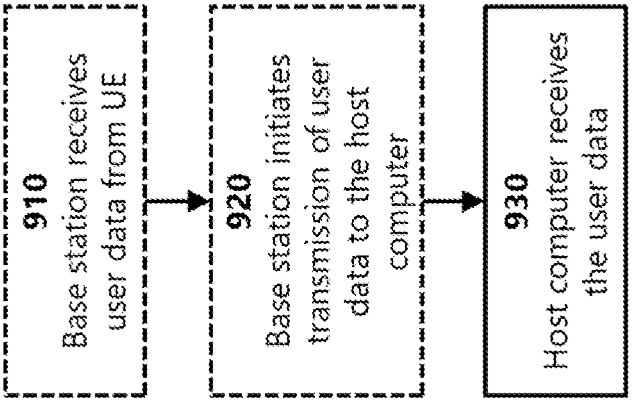
FIG. 25 is a flowchart illustrating a method implemented in a communication system, according to certain embodiments.

FIG. 25 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 25 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

1× RTT CDMA2000 1× Radio Transmission Technology
3GPP 3rd Generation Partnership Project
5G 5th Generation
5GC 5th Generation Core
5G-S-TMSI temporary identifier used in NR as a replacement of the S-TMSI in LTE
ABS Almost Blank Subframe
AMF Access Management Function
ARQ Automatic Repeat Request
ASN.1 Abstract Syntax Notation One
AWGN Additive White Gaussian Noise
BCCH Broadcast Control Channel
BCH Broadcast Channel
BWP Bandwidth Part
CA Carrier Aggregation
CC Carrier Component
CCCH SDU Common Control Channel SDU
CDMA Code Division Multiplexing Access
CGI Cell Global Identifier
CIR Channel Impulse Response
CMAS Commercial Mobile Alert System
CN Core Network
CORESET Control Resource Set
CP Cyclic Prefix
CPICH Common Pilot Channel
CPICH Ec/No CPICH Received energy per chip divided by the power density in the band
CRC Cyclic Redundancy Check
CQI Channel Quality information
C-RNTI Cell RNTI
CSI Channel State Information
DCCH Dedicated Control Channel
DCI Downlink Control Information
div Notation indicating integer division.
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre ECGI Evolved CGI
eNB E-UTRAN NodeB
ePDCCH enhanced Physical Downlink Control Channel
EPS Evolved Packet System
E-SMLC evolved Serving Mobile Location Center
E-UTRA Evolved UTRA
E-UTRAN Evolved UTRAN
ETWS Earthquake and Tsunami Warning System
FDD Frequency Division Duplex
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
ID Identity/Identifier
IMSI International Mobile Subscriber Identity
I-RNTI Inactive Radio Network Temporary Identifier
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
mod modulo
ms millisecond
MSC Mobile Switching Center
MSI Minimum System Information
NPDCCH Narrowband Physical Downlink Control Channel
NAS Non-Access Stratum
NGC Next Generation Core
NG-RAN Next Generation RAN
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PF Paging Frame
PGW Packet Gateway
PHICH Physical Hybrid-ARQ Indicator Channel
PLMN Public Land Mobile Network
PMI Precoder Matrix Indicator
PO Paging Occasion
PRACH Physical Random Access Channel
PRB Physical Resource Block
P-RNTI Paging RNTI
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RMSI Remaining Minimum System Information
RNA RAN Notification Area
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SAE System Architecture Evolution
SCH Synchronization Channel
SCell Secondary Cell
SDU Service Data Unit
SFN System Frame Number
SGW Serving Gateway
SI System Information
SIB System Information Block
SIB1 System Information Block type 1
SNR Signal to Noise Ratio
SON Self Optimized Network
SS Synchronization Signal
SSS Secondary Synchronization Signal
S-TMSI SAE-TMSI
TDD Time Division Duplex
TMSI Temporary Mobile Subscriber Identity
TDOA Time Difference of Arrival
TOA Time of Arrival
TSS Tertiary Synchronization Signal
TS Technical Specification
TSG Technical Specification Group
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WG Working Group
WLAN Wide Local Area Network

The invention claimed is:

1. A method performed by a wireless device for indicating an uplink performance metric in a beam sweep report, the method comprising:

determining a downlink channel quality associated with each beam of a plurality of downlink beams;

determining uplink performance metric associated with each beam of the plurality of downlink beams, wherein the uplink performance metric is based on a maximum available uplink output power (MAUOP), wherein the MAUOP is based on both an available power amplifier (PA) output power for the beam and a reduced maximum output power (P-MPR) for the beam, wherein the available PA output power for the beam is less than a maximum output power for the beam;

selecting a subset of the plurality of downlink beams for reporting in a beam sweep report; and transmitting a beam sweep report to a network node based on the selected subset of downlink beams, wherein the beam sweep report includes the uplink performance metric associated with each downlink beam in the subset of downlink beams.

2. The method of claim 1, further comprising obtaining an indication of a type of uplink performance metric to include in the beam sweep report.

3. The method of claim 1, wherein the uplink performance metric comprises a relative maximum uplink link budget based on the MAUOP.

4. A wireless device operable to indicate an uplink performance metric in a beam sweep report, the wireless device comprising processing circuitry operable to:

determine a downlink channel quality associated with each beam of a plurality of downlink beams;

determine uplink performance metric associated with each beam of the plurality of downlink beams, wherein the uplink performance metric is based on a maximum available uplink output power (MAUOP), wherein the MAUOP is based on both an available power amplifier (PA) output power for the beam and a reduced maximum output power (P-MPR) for the beam, wherein the available PA output power for the beam is less than a maximum output power for the beam;

select a subset of the plurality of downlink beams for reporting in a beam sweep report; and transmit a beam sweep report to a network node based on the selected subset of downlink beams, wherein the beam sweep report includes the uplink performance metric associated with each downlink beam in the subset of downlink beams.

5. The wireless device of claim 4, the processing circuitry further operable to obtain an indication of a type of uplink performance metric to include in the beam sweep report.

6. The wireless device of claim 4, wherein the uplink performance metric comprises a relative maximum uplink link budget based on the MAUOP.

7. The wireless device of claim 4, wherein the uplink performance metric comprises an absolute value, a relative value, or a mixture of absolute value and relative value.

* * * * *